(12) United States Patent
Kim et al.

(10) Patent No.: US 11,445,058 B2
(45) Date of Patent: Sep. 13, 2022

(54) ELECTRONIC DEVICE AND METHOD FOR CONTROLLING DISPLAY OPERATION THEREOF

(71) Applicant: Samsung Electronics Co., Ltd., Gyeonggi-do (KR)

(72) Inventors: Jongjin Kim, Gyeonggi-do (KR); Shinyoung Na, Gyeonggi-do (KR); Sunmi Park, Gyeonggi-do (KR); Hansol Lee, Gyeonggi-do (KR); Yoomi Tak, Gyeonggi-do (KR); Sangmin Hwang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/032,643

(22) Filed: Sep. 25, 2020

(65) Prior Publication Data

US 2021/0127000 A1   Apr. 29, 2021

(30) Foreign Application Priority Data

Oct. 24, 2019  (KR) .......................... 10-2019-0133248

(51) Int. Cl.
*H04M 1/72403* (2021.01)
*G06F 3/041* (2006.01)
*G06F 3/04883* (2022.01)

(52) U.S. Cl.
CPC ...... *H04M 1/72403* (2021.01); *G06F 3/0412* (2013.01); *G06F 3/04883* (2013.01); *H04M 2250/22* (2013.01)

(58) Field of Classification Search
CPC .............. G06F 3/0412; G06F 3/04883; H04M 1/72403; H04M 2250/22
See application file for complete search history.

(56) References Cited

U.S. PATENT DOCUMENTS

2006/0211728 A1   9/2006 Greig et al.
2008/0297487 A1* 12/2008 Hotelling ............ G06F 3/04883
                                                345/173

(Continued)

FOREIGN PATENT DOCUMENTS

CN   106249872    12/2016
KR   2014-0010845  1/2014

(Continued)

OTHER PUBLICATIONS

International Search Report dated Jan. 22, 2021 issued in counterpart application No. PCT/KR2020/014533, 9 pages.

*Primary Examiner* — Ryan A Lubit
(74) *Attorney, Agent, or Firm* — The Farrell Law Firm, P.C.

(57) ABSTRACT

An electronic device includes a housing including a front plate, a rear plate, and a side member; a display having a first surface visible through the front plate; an inertial sensor; a proximity sensor disposed on a second surface of the display; a processor; and a memory. The memory may store instructions that, when executed, cause the processor to determine a user's posture through the inertial sensor, in response to activation of a specific application using a function of the proximity sensor; determine a movement of the electronic device through the inertial sensor; determine the user's intent to use the display, based on the user's posture and the movement of the electronic device; and determine a configuration value of the proximity sensor, based on the determined intent to use the display.

16 Claims, 17 Drawing Sheets

(56) References Cited

U.S. PATENT DOCUMENTS

| | | | |
|---|---|---|---|
| 2010/0164479 A1* | 7/2010 | Alameh | G06F 1/1626 |
| | | | 324/115 |
| 2012/0214542 A1* | 8/2012 | Sarin | H04M 1/0202 |
| | | | 455/550.1 |
| 2013/0183946 A1* | 7/2013 | Jeong | G06F 3/0488 |
| | | | 455/414.1 |
| 2013/0190057 A1* | 7/2013 | Sahu | H04M 1/72403 |
| | | | 455/566 |
| 2014/0024356 A1 | 1/2014 | Yoon et al. | |
| 2014/0302893 A1* | 10/2014 | Dhavaloganathan | |
| | | | H04M 1/72463 |
| | | | 455/566 |
| 2014/0364162 A1 | 12/2014 | Juang et al. | |
| 2015/0378452 A1 | 12/2015 | Oshinome et al. | |
| 2016/0014577 A1* | 1/2016 | Mannan | H04W 4/16 |
| | | | 455/415 |
| 2016/0275283 A1* | 9/2016 | de Leon | G09G 5/36 |
| 2016/0320907 A1 | 11/2016 | Huppi et al. | |
| 2017/0090608 A1* | 3/2017 | Vieta | H04M 1/72454 |
| 2018/0341360 A1* | 11/2018 | Zhou | G06F 3/04883 |
| 2019/0114005 A1 | 4/2019 | Kies et al. | |
| 2019/0306298 A1 | 10/2019 | Yoon et al. | |
| 2020/0209357 A1* | 7/2020 | Enenkel | G01S 7/4816 |
| 2021/0090523 A1* | 3/2021 | Huang | G09G 5/006 |

FOREIGN PATENT DOCUMENTS

| | | |
|---|---|---|
| KR | 1020160023428 | 3/2016 |
| WO | WO 2012/166277 | 12/2012 |

* cited by examiner

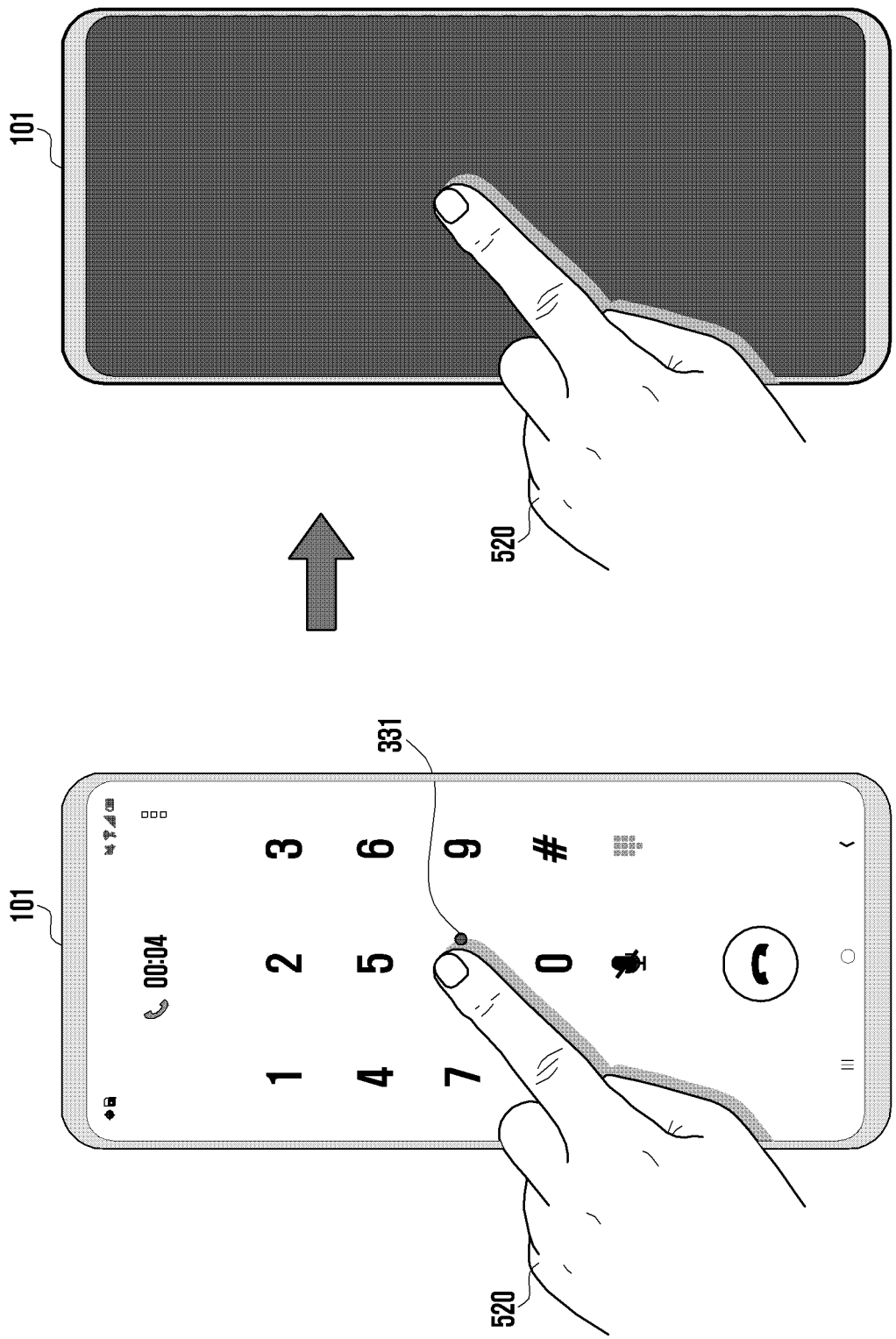

ELECTRONIC DEVICE AND METHOD FOR CONTROLLING DISPLAY OPERATION THEREOF

CROSS-REFERENCE TO RELATED APPLICATION(S)

This application is based on and claims priority under 35 U.S.C. § 119 to Korean Patent Application No. 10-2019-0133248, filed on Oct. 24, 2019, in the Korean Intellectual Property Office, the entire disclosure of which is incorporated herein by reference.

BACKGROUND

1. Field

The present relates generally to an electronic device including a display and a method for controlling a display operation thereof.

2. Description of Related Art

Electronic devices with diverse functions may be implemented as multimedia players having complex functions, such as multimedia players with still or moving image capturing functions, music or video file playback functions, gaming functions, broadcast receiving functions, or call functions. Such an electronic device may include a display to display screen related to functions.

An electronic device may include a proximity sensor in an area of a surface thereof (e.g., on the front surface on which the display is positioned) that is capable of sensing whether or not entities (or objects) approach. An electronic device may allow the user to easily control the operation (e.g., turning on/off) of the display thereof by using the proximity sensor during a telephone call.

SUMMARY

The disclosure has been made to address the above-mentioned problems and disadvantages, and to provide at least the advantages described below.

According to an aspect of the disclosure, an electronic device includes a housing including a front plate, a rear plate, and a side member; a display having a first surface visible through the front plate; an inertial sensor; a proximity sensor disposed on a second surface of the display; a processor; and a memory. The memory may store instructions that, when executed, cause the processor to determine a user's posture through the inertial sensor, in response to activation of a specific application using a function of the proximity sensor; determine a movement of the electronic device through the inertial sensor; determine the user's intent to use the display, based on the user's posture and the movement of the electronic device; and determine a configuration value of the proximity sensor, based on the determined intent to use the display.

According to another aspect of the disclosure, a method for operating an electronic device includes determining a user's posture through an inertial sensor, in response to activation of a specific application using a function of a proximity sensor; determining a movement of the electronic device through the inertial sensor; determining the user's intent to use a display, based on the user's posture and the movement of the electronic device; and determining a configuration value of the proximity sensor, based on the determined intent to use the display.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5B illustrates an auto screen off function of an electronic device, according to an embodiment;

DETAILED DESCRIPTION

An electronic device according to various embodiments may determine the user's intent to use a display and may configure a recognition criterion to be used by a proximity sensor to recognize an approaching object, based on the user's intent to use the display, thereby improving the auto screen off function.

An electronic device according to various embodiments may configure a relatively high criterion for recognizing an approaching object, if it is determined that the user has an intent to use a display while a specific application that uses a function of a proximity sensor is activated, thereby preventing the display screen from turning off in response to a temporary approach of an object (for example, the user's hand).

An electronic device according to various embodiments may configure a relatively low criterion for recognizing an approaching object, if it is determined that the user has no intent to use a display while a specific application that uses a function of a proximity sensor is activated, such that the display screen is quickly turned off even in the case of a temporary approach of the object.

An auto screen off function refers to a function of turning off the screen when the proximity sensor senses an approaching object such that, while a specific application (for example, a telephone call application) is being executed, the user's inadvertent touch input (for example, touch input by his/her ears or cheeks) is not sensed. If the user manipulates a user interface through the display while a specific application (for example, a voice communication application) using a proximity sensor function is activated, a user input occurring near the proximity sensor may turn off the display against the user's intent.

Figure 1:
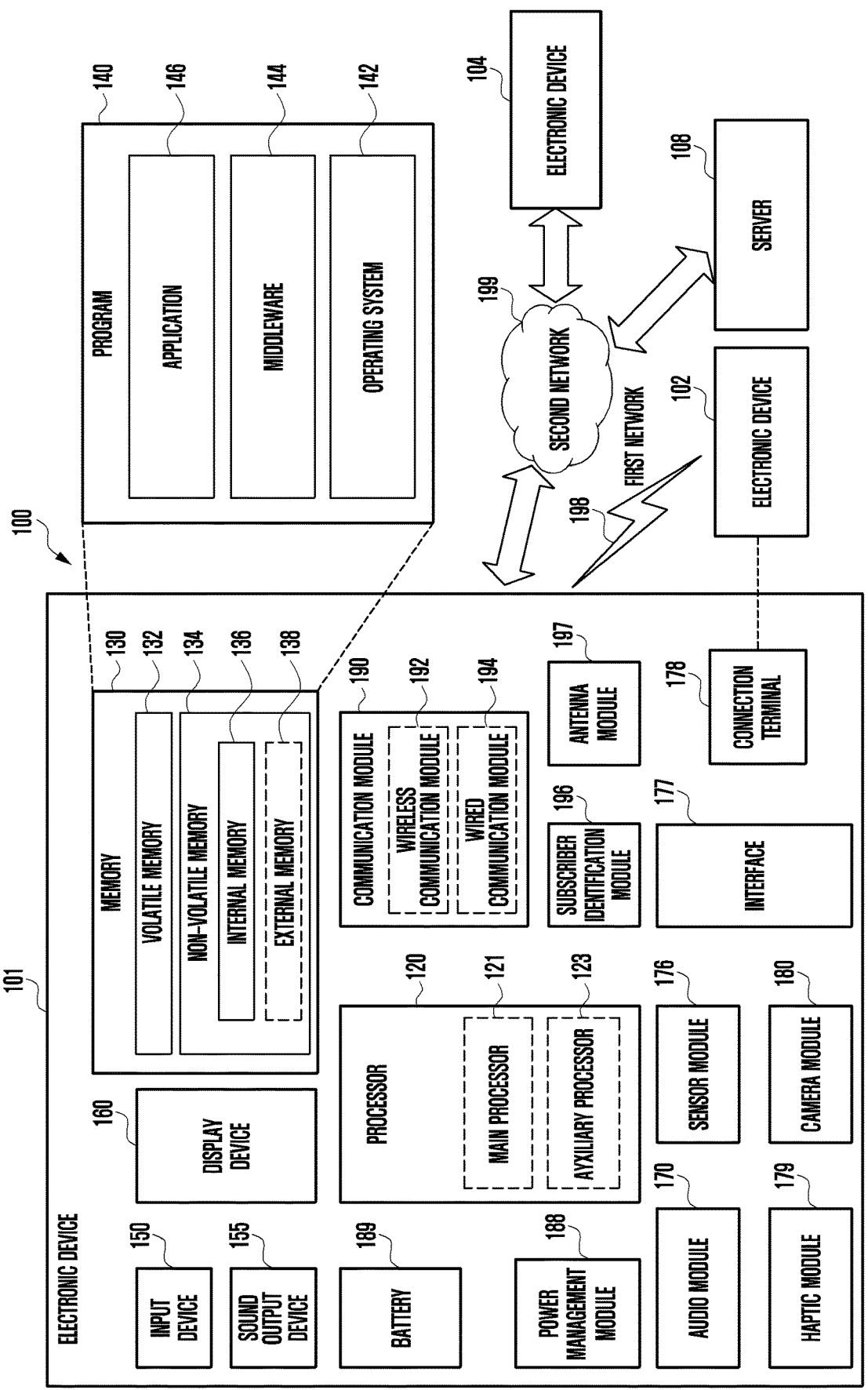
FIG. 1 illustrates an electronic device inside a network environment, according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
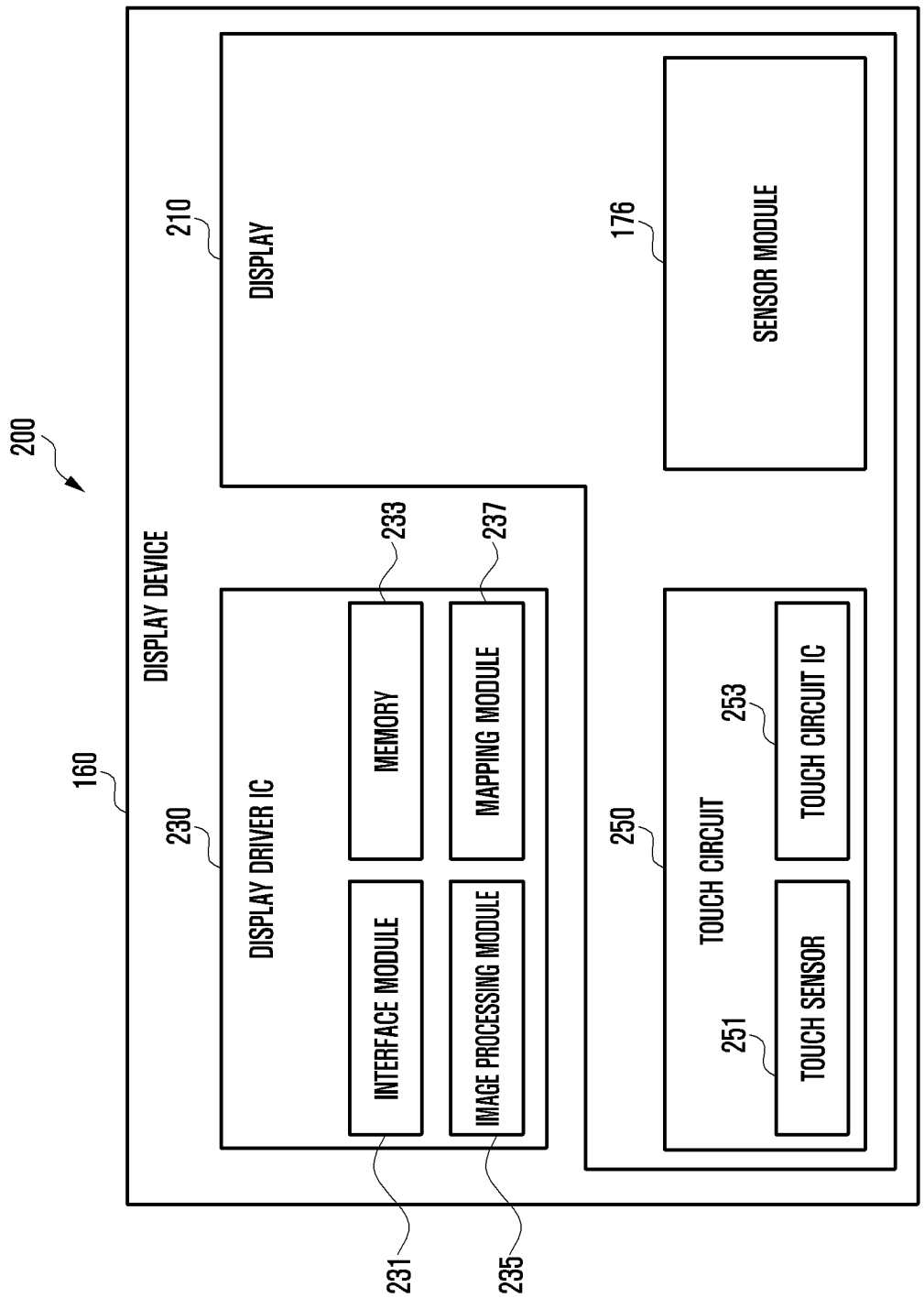
FIG. 2 illustrates a display device, according to an embodiment.

FIG. 2 illustrates the display device 160 according to an embodiment.

Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis.

The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3:
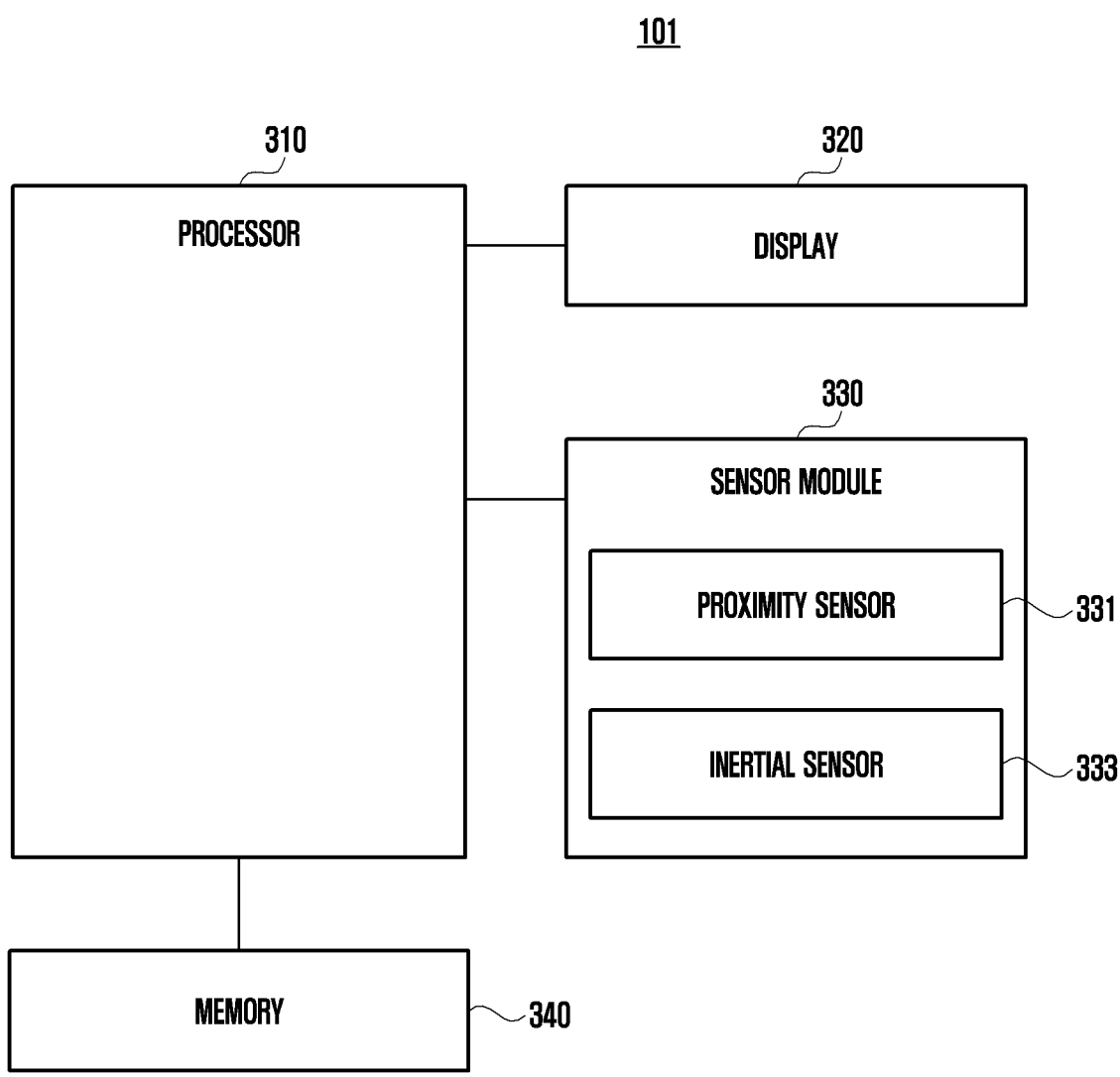
FIG. 3 illustrates an electronic device, according to an embodiment.

FIG. 3 illustrates an electronic device, according to an embodiment.

Referring to FIG. 3, the electronic device 101 includes a processor 310 (for example, processor 120 in FIG. 1), a display 320 (for example, display device 160 in FIG. 1 or display device 160 in FIG. 2), a sensor module 330 (for example, sensor module 176 in FIG. 1 or sensor module 176 in FIG. 2), or a memory 340 (for example, memory 130 in FIG. 1). Some of the components illustrated in FIG. 3 may be omitted or replaced without any difficulty in implementing various embodiments disclosed in this document.

The electronic device 101 according to various embodiments may have a housing (not illustrated) (for example, housing 350 in FIG. 4A) including a front plate facing in a first direction, a rear plate facing in a second direction opposite to the first direction, and a side member surrounding a space between the front plate and the rear plate.

The processor 310 is configured to be able to perform control of respective components of the electronic device 101 and/or communication-related computation or data processing, and may include at least some of the components and/or functions of the processor 120 in FIG. 1. The processor 310 may be operatively connected to components of the electronic device 101. The processor 310 may load a command or data received from another component of the electronic device 101 into a memory 340 (for example, memory 130 in FIG. 1), may process the command or data stored in the memory 340, and may store result data.

The memory 340 may store instructions regarding the processor 310 described above.

The display 320 may display various screens under the control of the processor 310. The display 320 may be implemented as a touch sensor panel (TSP) capable of recognizing the touch or approach (e.g., hovering) of various external objects (e.g., a user's hands). The touch sensor panel may have various structures (G2, G1F, GFF, GFd, GF2, GF1, GF, etc.) and types, and contents regarding various embodiments disclosed in this document are all applicable regardless of the structure and type of the touch sensor panel. The display 320 may implemented in various forms including a liquid crystal display (LCD) and an organic light-emitting diode (OLED).

One surface of the display 320 may be seen through the front plate of the housing.

The sensor module 330 is configured to sense the operating state of the electronic device 101 or the environment state of the outside and to produce an electric signal or a data value corresponding to the sensed state, and may include at least some of the components and/or functions of the sensor module 176 in FIG. 1.

The sensor module 330 may include at least one of a proximity sensor 331 or an inertial sensor 333.

The proximity sensor 331 may be configured to sense an approach of a peripheral object without physical contact. The proximity sensor 331 may include, for example, an optical proximity sensor, a radio frequency (RF) proximity sensor, a capacitive proximity sensor, or an ultrasonic proximity sensor.

The optical proximity sensor may include a light emitter configured to emit light and a light receiver configured to light reflected by an external object. The optical proximity sensor may measure the amount of light which is emitted by the light emitter, for example, which is reflected by an external object, and which is directed to the light receiver, thereby determining whether or not an object exists or measuring the distance from the object (moving towards or away from the same). The optical proximity sensor may use, for example, infrared rays or visible rays.

The RF proximity sensor according to various embodiments may transmit an RF signal through at least one antenna and may receive the RF signal reflected by an external object, thereby measuring the distance from the external object. The RF proximity sensor may sense whether or not an object approaches by using multiple RF signals, which are connected to a frequency control signal, and which have different frequencies.

The capacitive proximity sensor may be configured to sense whether or not an external object approaches by using a change in the capacitance thereof. The capacitive proximity sensor may recognize the user's approach by using a hovering function of the touch sensor panel, for example. The ultrasonic proximity sensor may be configured to sense the approach of an object, based on ultrasonic waves, by using a speaker and a microphone.

The proximity sensor 331 may be disposed below the display 320 (or on the lower portion (e.g., under panel) of the display 320). When the front surface of the display 320 is seen through the front plate of the housing of the electronic device 101, the proximity sensor 331 may be disposed on the rear surface of the display 320. The proximity sensor 331 may be disposed between the display 320 and the rear plate of the housing.

The processor 310 may drive the proximity sensor 331 in response to activation of a specific application using a function of the proximity sensor 331 (e.g., a telephone speech application or a voice message application).

The inertial sensor 333 may be configured to detect the inertia of a movement, thereby measuring the acceleration, speed, direction, or distance of the electronic device 101 during a movement thereof. The inertial sensor 333 may include at least one of an accelerometer, a gyroscope, or a geomagnetic sensor.

The acceleration sensor according to various embodiments may be configured to measure an acceleration acting along x/y/z axes. The acceleration sensor may measure the intensity of acceleration or impact of an object. The acceleration sensor may measure a dynamic force of an acceleration, a vibration, an impact, etc., thereby producing an acceleration signal. If there is no movement of the electronic device 101 including the acceleration sensor, a gravitational acceleration vale may be measured. If the electronic device 101 including the acceleration sensor moves, a vibration in the direction of movement may be measured as the amount of change in acceleration.

The gyroscope according to various embodiments may be configured to measure an angular velocity acting along x/y/z axes. The gyroscope may measure the amount of rotation of the electronic device 101 with regard to each axis by using angular velocity information measured for each axis, for example.

The geomagnetic sensor may be configured to measure the azimuth of the electronic device 101, based on a geomagnetic field, by using the magnitude and direction of a geomagnetic field vector measured along x/y/z axes.

The processor 310 may recognize a posture (or motion) of the electronic device 101 and/or the user by using the inertial sensor 333. When the user makes a phone call by using the electronic device 101, the processor 310 may determine various postures of the user by using the inertial sensor 333.

The processor 310 may track a change in posture of the user by through the inertial sensor 333, and may determine the user's posture on the basis of the tracking result. The processor 310 may extract sensor data (e.g., an acceleration value and/or a gravity value) provided by the acceleration sensor of the inertial sensor 333, may track the user based on the extracted sensor data, and may determine the user's posture based on the result of tracking the user.

The processor 310 may measure the angle of the electronic device 101 by using the inertial sensor 333, for example. The processor 310 may calculate the angle of the electronic device 101 with regard to each axis by using the acceleration value of the inertial sensor 333 with regard to each axis and the vector sum (e.g., a square root of an acceleration value with regard to each axis) of the acceleration sensor.

The processor 310 may determine the user's posture by using the angle of the electronic device 101 calculated with regard to each axis. It will be assumed, for example, that the tilt angle of the acceleration sensor (e.g., angle with reference to y-axis) is 0° when the display 320 of the electronic device 101 faces upwards, and the tilt angle of the acceleration sensor is 90° when the electronic device 101 stands upright. The processor 310 may determine that the user is viewing the display 320 of the electronic device 101 in an upright position if the tilt angle of the acceleration angle is equal to/larger than 0° and less than 60°. The processor 310 may determine that the user is viewing the display 320 of the electronic device 101 in a lying position if the tilt angle of the acceleration angle is equal to/larger than 120° and less than 160°. The processor 310 may determine that the user is viewing the display 320 of the electronic device 101 in a sideways lying position if the angle of the acceleration angle with regard to y-axis is 0°, and if the angle thereof with regard to x-axis is equal to/larger than −30° and less than 30°.

The posture in which the user uses the electronic device 101 during a phone call may be variously classified, as in the example given in Table 1 below, in each state (or situation) in which the user uses the electronic device 101:

TABLE 1

| User's state | Posture |
| --- | --- |
| First state (right-hand holding) | Posture 1: receiving call in upright position |
| | Posture 2: supporting phone with shoulder |
| | Posture 3: receiving call in lying position |
| | Posture 4: receiving call in sideways lying position |
| Second state (left-handing holding) | Posture 5: receiving call in upright position |
| | Posture 6: supporting phone with shoulder |
| | Posture 7: receiving call in lying position |
| | Posture 8: receiving call in sideways lying position |
| Third state (screen viewing) | Posture 9: viewing screen in upright position |
| | Posture 10: viewing screen in lying position |
| | Posture 11: viewing screen in sideways lying position |

The processor 310 may determine the user's posture by using the inertial sensor 333, and may determine whether or not the user's receiving a phone call or staring at (or viewing) the display 320 in that posture.

The processor 310 may determine the movement of the electronic device 101 by using the inertial sensor 333. The processor 310 may extract sensor data (for example, acceleration value and/or gravity value) provided by the acceleration sensor of the inertial sensor 333, and may determine the movement of the electronic device 101, based on the extracted sensor data. The processor 310 may extract sensor data (e.g., angular velocity value) provided by the gyroscope of the inertial sensor 333, and may determine the movement of the electronic device 101, based on the extracted sensor data.

The processor 310 may measure a change in angle resulting from the movement of the electronic device 101 through the inertial sensor 333. The processor 310 may calculate the vector sum and variance of the acceleration sensor of the inertial sensor 333, thereby calculating a change in angle of the electronic device 101. The processor 310 may integrate the rate of rotation of the electronic device 101 measured through the gyroscope of the inertial sensor 333, thereby measuring a change in angle of the electronic device 101.

The processor 310 may identify whether or not the determined movement of the electronic device 101 is included in a preconfigured threshold range. The processor 310 may identify whether or not the absolute value of the amount of change in the angle of the electronic device 101 is equal to/less than 10°. The processor 310 may determine that the movement of the electronic device 101 has slowed down if the movement of the electronic device 101 is included in the preconfigured threshold range and, in this case, may determine that the user is using the electronic device 101 while staring at the display 320 of the electronic device 101.

The processor 310 may determine the user's intent to use the display 320, based on the determined posture of the user and the determined movement of the electronic device 101.

The processor 310 may determine that the user has an intent to use the display 320, if the user is staring at the display 320 of the electronic device 101, and if the movement of the electronic device 101 is occurring within the preconfigured threshold range, for example.

The processor 310 may determine that the user has no intent to use the display 320, if the user is not staring at the display 320 (for example, if the user is receiving a phone call). The processor 310 may determine that the user has no intent to use the display 320, if the movement of the electronic device 101 exceeds the preconfigured threshold range (e.g., if the absolute value of the amount of change in the angle of the electronic device 101 exceeds 10°).

The processor 310 may determine a configuration value of the proximity sensor 331 for determining whether or not an object approaches, based on the determined user's intent to user the display 320. The processor 310 may configure a reference value to be used by the proximity sensor 331 to recognize an approaching object, based on the determined user's intent to user the display 320. The configuration value may include a configuration value regarding a recognition time during which an object is recognized, in order to determine whether or not an object approaches. The configuration value may include a configuration value regarding the number of sampled to be recognized to determine whether or not an object approaches.

The processor 310 may determine at least one of the recognition time or the number of sampled to be recognized, which is to be used by the proximity sensor 331 to determine whether or not an object approaches, based on the determined user's intent.

The recognition time of the proximity sensor 331 may refer to a time during which the proximity sensor 331 can acquire a result value after an external object has approached. If a long recognition time is configured, it is impossible to quickly determine whether or not an external object approaches, and no response is made to a temporary approach (for example, a gesture of lowering the status bar), thereby filtering out temporary approaches. In such a case, in which a temporary approach is not recognized by the proximity sensor 331, the display 320 may not be turned off through an auto screen off function. If a short recognition time is configured, a quick determination regarding whether or not an approach occurs may be made, thereby turning off the display 320 through the auto screen off function before the user makes an inadvertent touch input (for example, a touch input by his/her ears or cheeks).

The number of samples to be recognized by the proximity sensor 331 may refer to the number of sampled to be identified to determine whether or not an external object approaches. If a large number of samples to be recognized is configured, a long time (that is, a recognition time) is necessary to determine whether or not an external object approaches, and thus it is impossible to quickly determine whether or not an external object approaches, but no response is made to a temporary approach (e.g., a gesture of lowering the status bar), thereby filtering out temporary approaches. If a small number of samples to be recognized by the proximity sensor 331 is configured, a quick determination regarding whether or not an approach occurs may be made, thereby instantly turning off the display 320 in response to an approaching external object.

Table 2, below, gives an example of configuring the recognition time or the number of samples to be recognized by the proximity sensor 331 according to the user's intent to use the display 320. Values enumerated in Table 2 below are exemplary, and may be variously configured.

TABLE 2

|  | When intent to use display exists | When no intent to use display exists |
|---|---|---|
| Recognition time (ms) | 500 | 100 |
| Number of samples to be recognized | 50 | 10 |

If it is determined that the user has an intent to use the display 320, the processor 310 may configure a relatively long recognition time (e.g., 500 ms) in order to filter out the user's temporary approaches. If it is determined that the user has an intent to use the display 320, the processor 310 may configure a relatively large number of samples (e.g., 50 samples) to be recognized.

If it is determined that the user has no intent to use the display 320, the processor 310 may configure a relatively short recognition time (e.g., 10 ms) in order to instantly turn off the display 320 in response to the user's approach. If it is determined that the user has no intent to use the display 320, the processor 310 may configure a relatively small number of samples (e.g., 10 samples) to be recognized.

If the proximity sensor 331 is an optical proximity sensor 331, the amount of light to be used by the proximity sensor 331 to recognize an approach may be determined based on the user's intent to use the display 320. If it is determined that the user has an intent to use the display 320, the processor 310 may configure a high threshold value regarding the amount of light to be used by the proximity sensor 331 to recognize an approach, thereby processing confirmed approaches only, and filtering out temporary approaches. If it is determined that the user has no intent to use the display 320, the processor 310 may configure a low threshold value regarding the amount of light to be used by the proximity sensor 331 to recognize an approach, thereby improving the response rate for determining whether or not an approach occurs.

The processor 310 may determine, based on the user's intent to use the display 320, whether to use all recognized samples or to select and use only some of the samples. If it is determined that the user has no intent to use the display 320, the processor 310 may increase the approach recognition rate in order to identify all samples to be recognized. If it is determined that the user has an intent to use the display 320, the processor 310 may select and identify only specific samples, thereby filtering out temporary approaches.

Figure 4A:
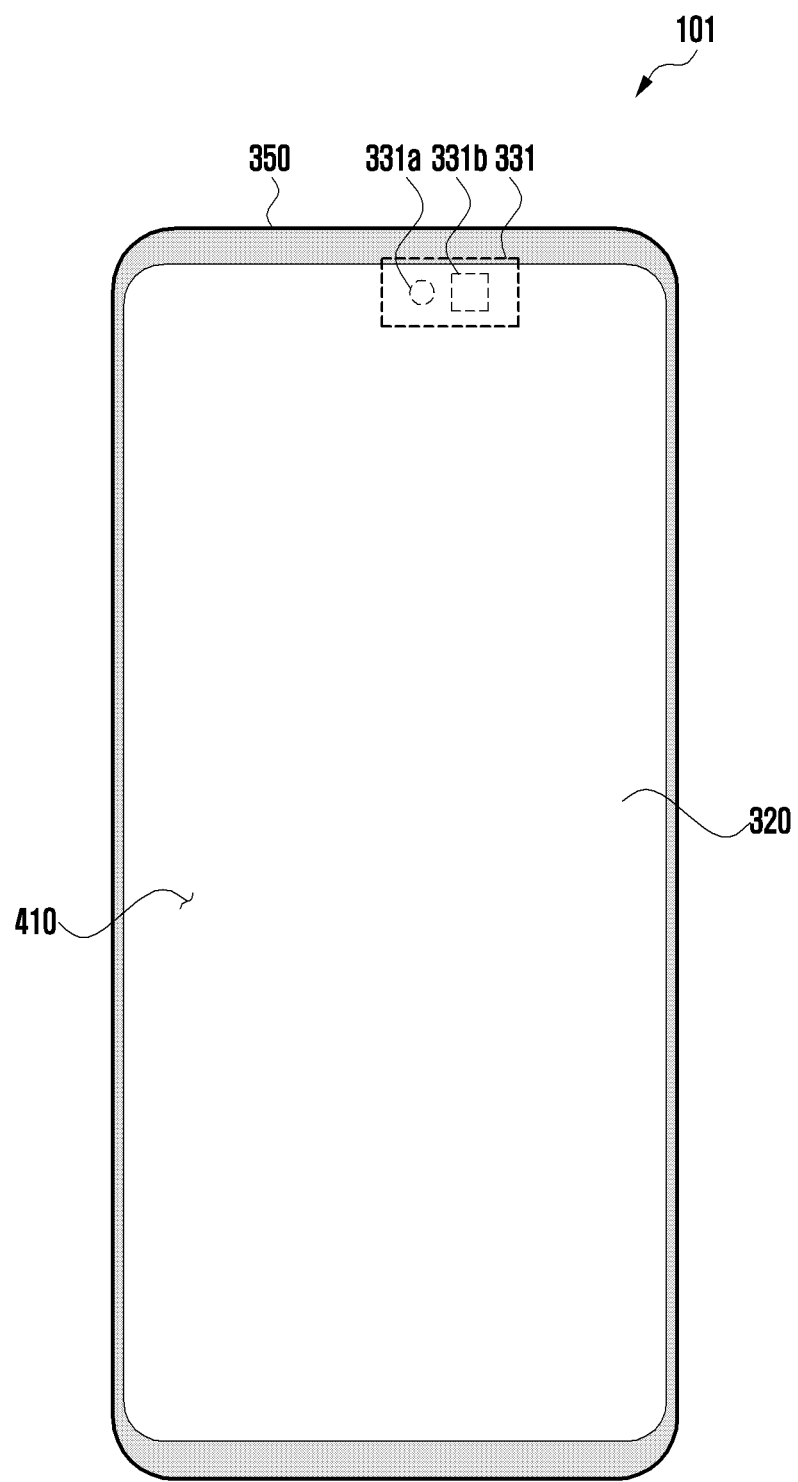
FIG. 4A illustrates an electronic device, according to an embodiment.
Figure 4B:
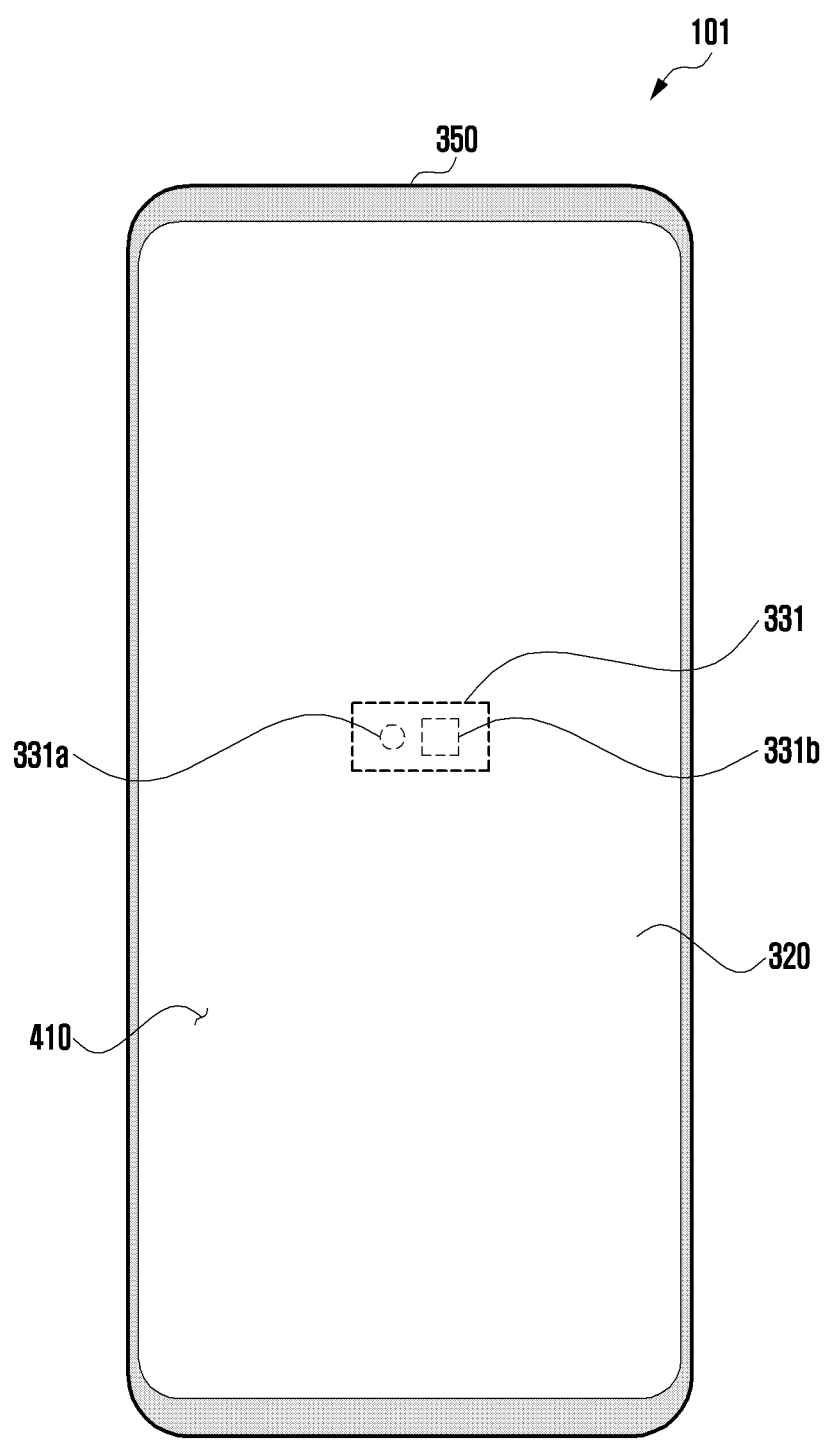
FIG. 4B illustrates an electronic device, according to an embodiment.

FIG. 4A illustrates an electronic device, according to an embodiment. FIG. 4B is a diagram illustrating an electronic device, according to an embodiment. Specifically, FIG. 4A illustrates a position of a proximity sensor 331 mounted on an electronic device 101, and FIG. 4B illustrates a position of a proximity sensor 331 mounted on an electronic device 101.

The electronic device 101 may include a housing 350, a display 320, and a proximity sensor 331 or an inertial sensor.

The housing 350 may refer to an external part surrounding the electronic device 101. The housing 350 may include a front plate 410 facing in a first direction, a rear plate facing in a second direction opposite to the first direction, and a side member surrounding a space between the front plate 410 and the rear plate.

The display 320 may be disposed on at least a part of the front plate 410 of the housing 350, and the display 320 may be disposed on at least a part of the front plate 410 to be visible to the outside. Inputs by various external objects (for example, the user's hands) on the display 320 may be received.

In line with an increasing number of electronic devices 101 designed such that the display 320 occupies a large area on the front plate 410 (for example, bezel-less display 320), the region on the front plate 410, in which various components are to be disposed, decreases. As a result of the decreasing area of the region in which components are to be disposed, components increasingly tend to be disposed between the display 320 and the rear plate. The proximity sensor 331 may be disposed between the display 320 and the rear plate. The proximity sensor 331 may include a light emitter 331a and a light receiver 331b. In general, the proximity sensor 331 may not be recognized by human eyes in an environment in which the display operates. When the proximity sensor 331 is driven, light emitted through the light emitter 331a may be displayed.

FIG. 4A illustrates an embodiment in which the proximity sensor 331 is disposed on the top part of the display 320 with reference to the vertical length of the display 320, and FIG. 4B illustrates an embodiment in which the proximity sensor 331 is disposed in the middle part of the display 320. By disposing the proximity sensor 331 between the display 320 and the rear plate of the housing 350, the position in which the proximity sensor 331 is disposed on a plane of the display 320 (that is, on the front surface of the display 320) may be variously implemented.

Figure 5A:
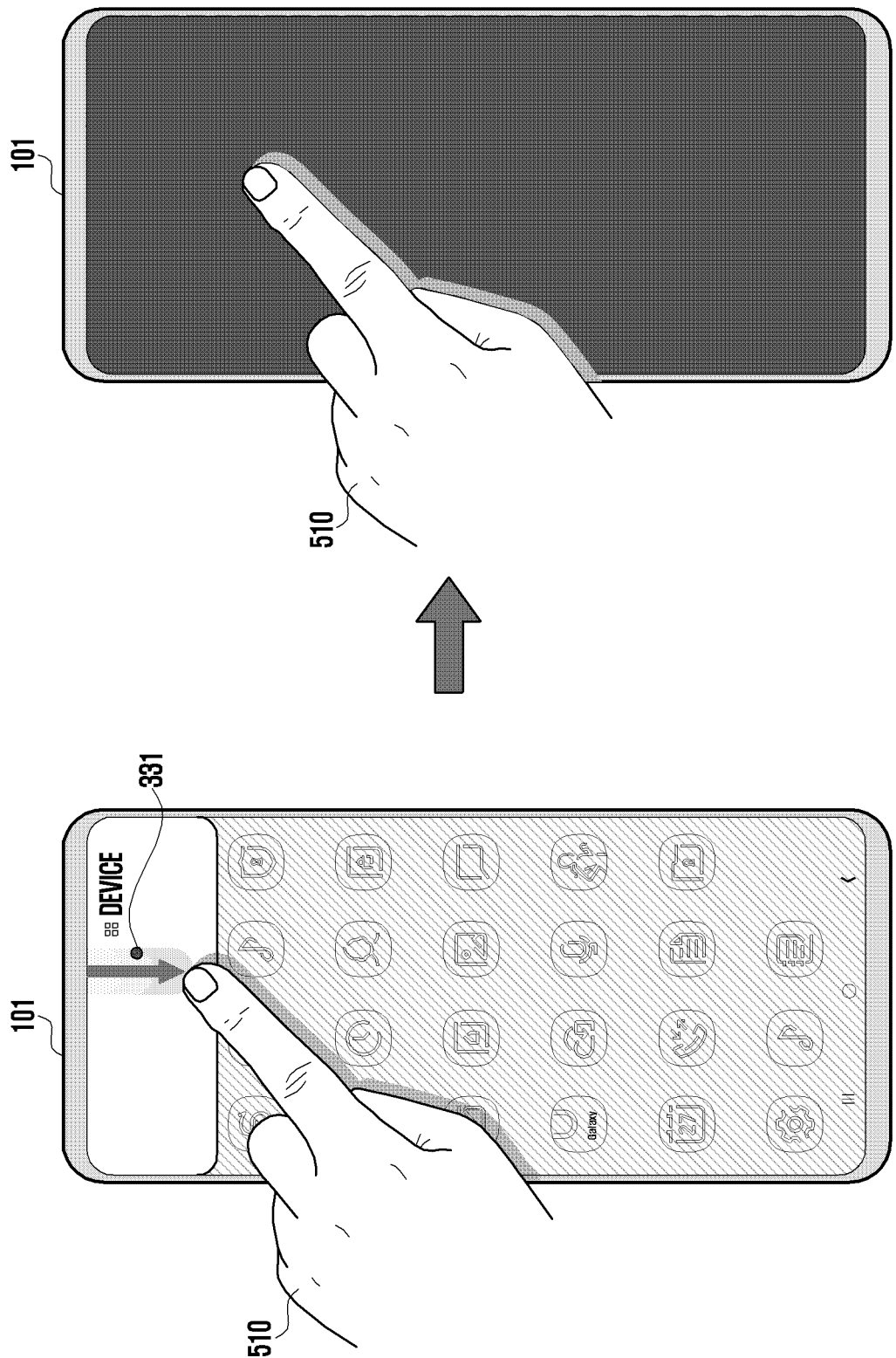
FIG. 5A illustrates an auto screen off function of an electronic device, according to an embodiment.

FIG. 5A illustrates an auto screen off function of an electronic device, according to an embodiment. FIG. 5B illustrates an auto screen off function of an electronic device, according to an embodiment. FIG. 5A illustrates a case in which the proximity sensor 331 is disposed on the top part of the screen of the display 320 of the electronic device 101, and FIG. 5B illustrates a case in which a proximity sensor 331 is disposed on the middle part of the screen of the display 320 of the electronic device 101.

The processor 310 may control operations of the display 320 by using the proximity sensor 331 while a specific application (e.g., a telephone call application or a voice message application) is executed. The processor 310 may turn off the display 320 if an approaching external object is sensed through the proximity sensor 331 (for example, if the electronic device 101 is next to the user's ears or cheeks) while a telephone call application is executed. The processor 310 may also turn on the display 320 if no approaching external object is sensed through the proximity sensor 331 (e.g., if the electronic device 101 moves away from the user) while the telephone call application is executed. The display 320 auto screen off function may prevent the occurrence of erroneous operations due to touch inputs by the user's face or ears while a specific application is executed.

If the proximity sensor 331 is disposed below the display 320 (e.g., disposed on the rear surface of the display) in order to expand the display 320 region, the display 320 screen may be turned off by the user's hand approaching the proximity sensor 331 for a touch input on the screen, not by the user's ears or cheeks approaching the proximity sensor 331 according to the user's posture during a phone call.

Referring to FIG. 5A, the electronic device 101 may sense the approach of the user's hand 510 through the proximity sensor 331 while a specific application (for example, a telephone call application or a voice message application) that uses a function of the proximity sensor 331 is executed. If the electronic device 101 receives a touch input from the user dragging the status bar downwards while a telephone call application is executed, the proximity sensor 331 may sense the approach of the user's hand 510 resulting from the touch input, and the electronic device 101 may accordingly turn off the screen of the display 320.

In such a case, the user may not make a touch input as desired, due to the display 320 auto screen off function.

Referring to FIG. 5B, if the user's touch input for touching a keypad is received while the telephone call application is executed, the electronic device 101 may sense the approach of the user's hand 520 resulting from the touch input. In response to the approach, the proximity sensor 331 may sense the approach of the user's hand 520, and the electronic device 101 may turn off the screen of the display 320.

The user may not touch the keypad as desired, because the screen of the display 320 is turned off.

The processor 310 of the electronic device 101 may determine the user's intent to use the display 320, and may determine a configuration value of the proximity sensor 331 based on the determined user's intent to use the display 320. The processor 310 may configure each reference value to be used by the proximity sensor 331 to recognize an object, based on the determined user's intent to use the display 320.

Figure 6:
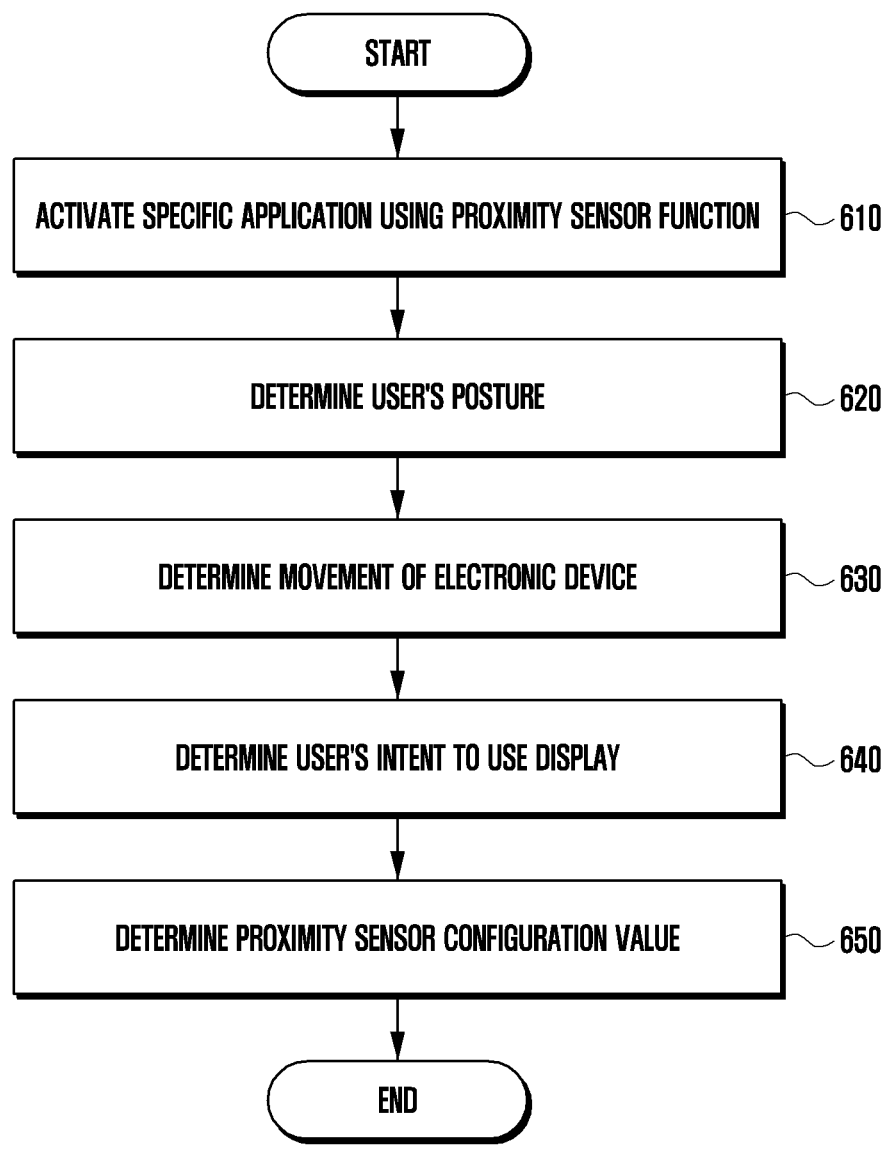
FIG. 6 is a flowchart illustrating a method of an electronic device, according to an embodiment.

FIG. 6 is a flowchart illustrating a method of an electronic device, according to an embodiment.

Referring to the flowchart 600, a processor 310 of an electronic device 101 identifies whether or not a specific application that uses a function of a proximity sensor 331 has been activated, in step 610. The specific application that uses a function of the proximity sensor 331 may include, for example, a telephone speech application or a voice message application.

The processor 310 determines the user's posture through an inertial sensor 333, in response to activation of the specific application that uses a function of the proximity sensor 331, in step 620. For example, the processor 310 may determine whether the user is in a posture of receiving a telephone call or staring at (or viewing) a display 320 of the electronic device 101.

The processor 310 determine a movement of the electronic device 101 through the inertial sensor 333 in step 630. For example, the processor 310 may determine whether or not the movement of the electronic device 101 occurs within a preconfigured threshold range.

The processor 310 determines the user's intent to use the display 320, based on the determined user's posture and the determined movement of the electronic device 101, in step 640.

The processor 310 determines a configuration value to be used by the proximity sensor 331 to determine whether or not an object approaches, based on the determined use's intent to use the display 320, in step 650. The processor 310 may determine at least one of a recognition time during which the proximity sensor 331 is to determine whether or not an object approaches, or the number of samples to be recognized thereby, based on the determined use's intent.

Figure 7:
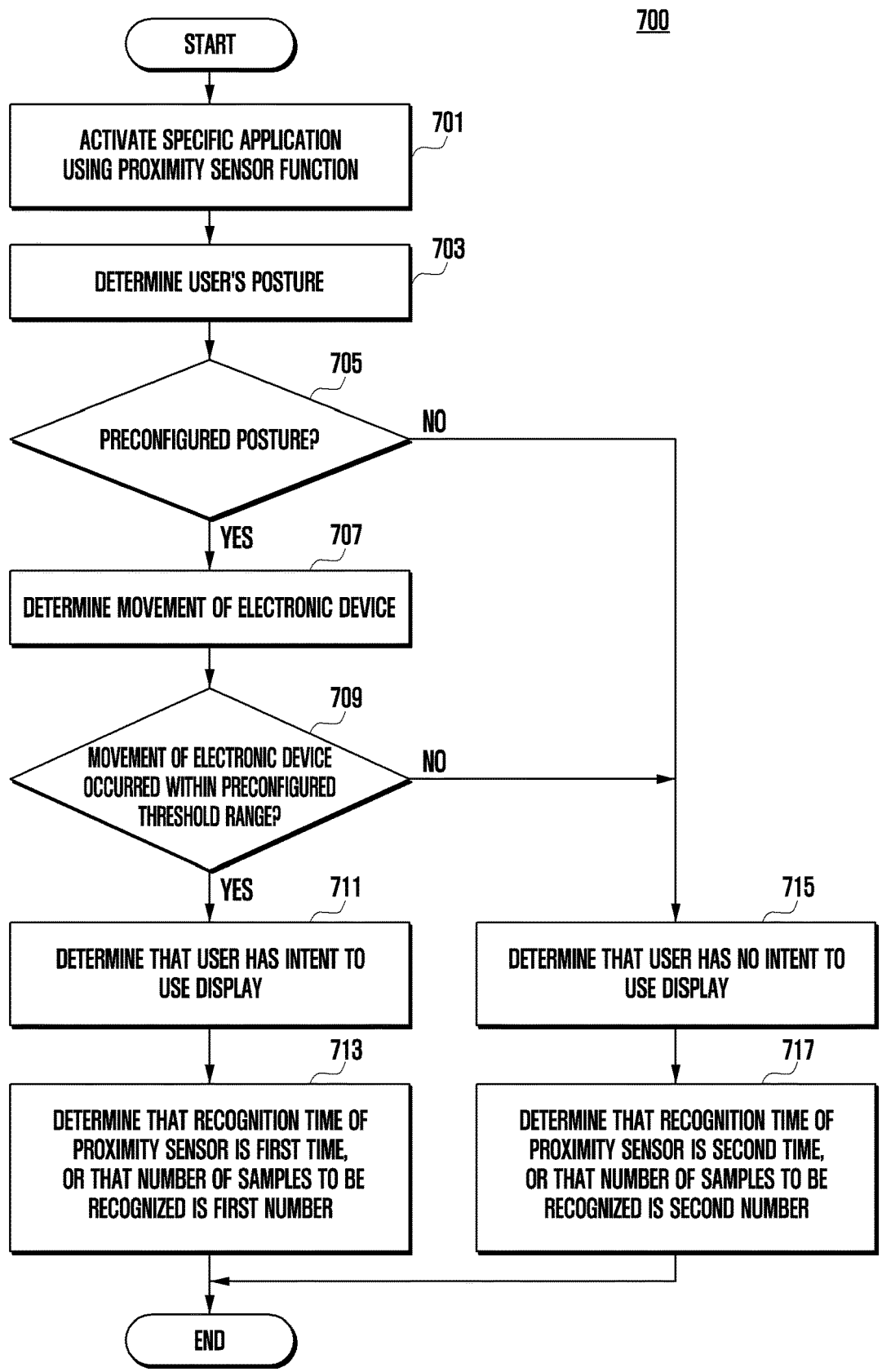
FIG. 7 is a flowchart illustrating a method of an electronic device, according to an embodiment.

FIG. 7 is a flowchart illustrating a method of an electronic device 101, according to an embodiment. The same descriptions as those in FIG. 6 will be omitted herein.

Referring to the flowchart 700, a processor 310 identifies whether or not a specification application that uses a function of a proximity sensor 331 has been activated, in step 701.

The processor 310 determines the user's posture through an inertial sensor 333, in response to activation of the specification application that uses a function of the proximity sensor 331, in step 703.

The processor 310 determines whether or not the determined user's posture corresponds to a preconfigured posture, in step 705. The preconfigured posture may be a posture in which the user is staring at a display 320. The posture in which the user is staring at the display 320 may include a posture in which the user views the display 320 of the electronic device 101 in an upright position, a posture in which the use views the same in a lying position, or a position in which the user views the same in a sideways lying position.

If it is determined in step 705 that the user's posture corresponds to the preconfigured posture, the processor 310 proceeds to step 707 and determines the movement of the electronic device 101 through the inertial sensor 333. The processor 310 may measure a change in the angle of the electronic device 101 through the inertial sensor 333.

If it is determined in step 705 that the user's posture does not correspond to the preconfigured posture, the processor 310 proceeds to step 715 and determines that the user has no intent to use the display 320 of the electronic device 101.

The processor 310 identifies whether or not the movement of the electronic device 101 has occurred within a preconfigured threshold range in step 709. The processor 310 may identify whether or not the angle of the electronic device 101 has been changed within a preconfigured threshold angle range.

If it is determined in step 709 that the movement of the electronic device 101 has occurred within the preconfigured threshold range, the processor 310 proceeds to step 711 and determines that the user has an intent to use the display 320 of the electronic device 101. The processor 310 determines, in step 713, that the recognition time of the proximity sensor 331 is a first time, or that the number of samples to be recognized by the proximity sensor 331 is a first number. If a second time shorter than the first time has been configured as a default value of the recognition time of the proximity sensor 331, the processor 310 may change/configure the recognition time of the proximity sensor 331 from the second time to the determined first time.

If it is determined in step 709 that the movement of the electronic device 101 has occurred outside the preconfigured threshold range, the processor 310 proceeds to step 715 and determines that the user has no intent to use the display 320 of the electronic device 101. The processor 310 determines, in step 717, that the recognition time of the proximity sensor 331 is a second time, or that the number of samples to be recognized by the proximity sensor 331 is a second number. The second time may be shorter than the first time, and the second number may be smaller than the first number.

Figure 8:
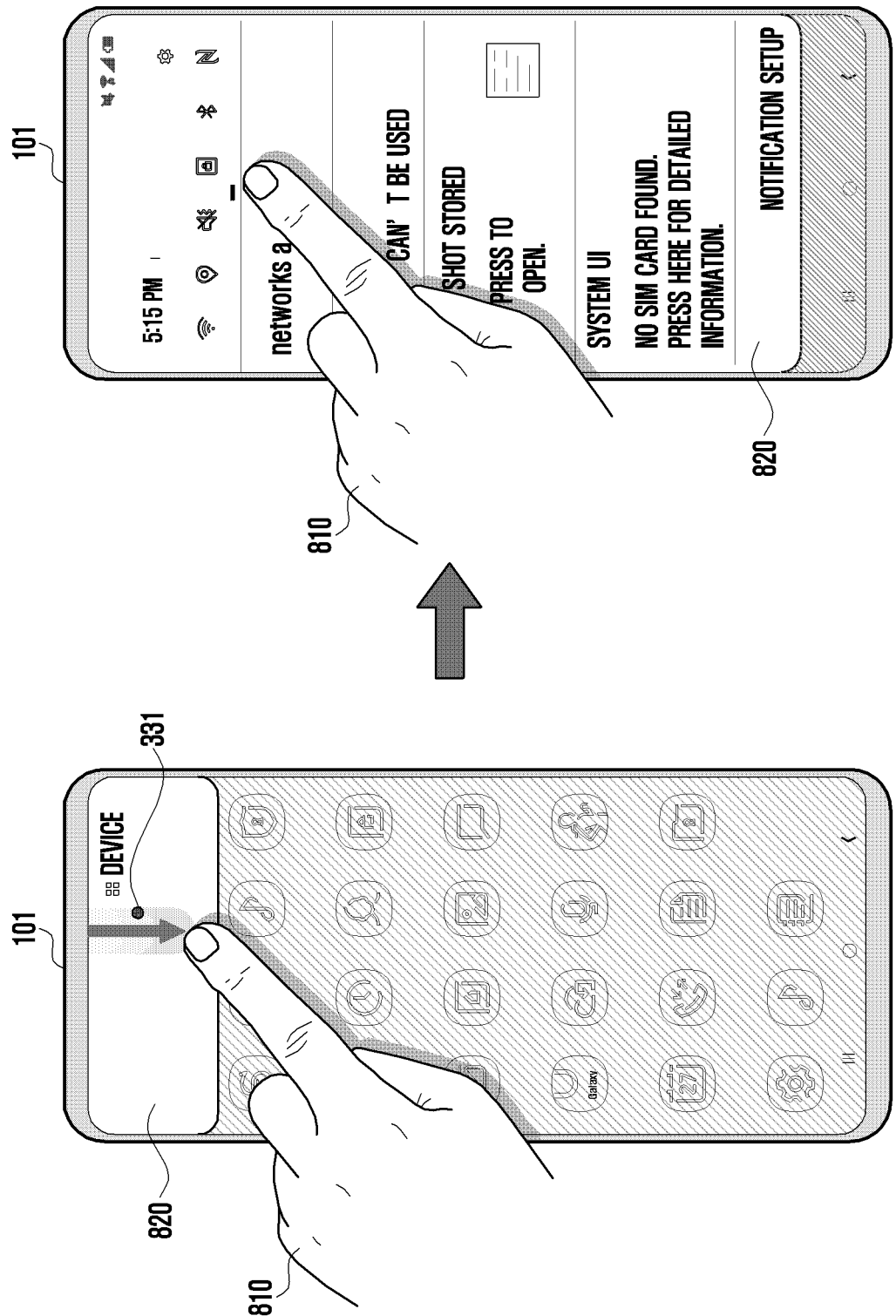
FIG. 8 illustrates operations of an electronic device, according to an embodiment.

FIG. 8 illustrates operations of an electronic device, according to an embodiment. FIG. 8 illustrates operations of an electronic device 101 when it is determined that the user of the electronic device 101 has an intent to use a display 320.

If it is determined that the user has an intent to use the display 320 of the electronic device 101, the processor 310 of the electronic device 101 may determine that the recognition time of a proximity sensor 331 is a first time, which is relatively long, or that the number of samples to be recognized is a first number, which is relatively large. The proximity sensor 331 may filter out temporary approaches of the user such that they are not sensed.

While a telephone call application that uses a function of the proximity sensor 331 is executed, the user may perform an operation of lowering a status bar 820 through a drag input 810 that moves from up to down. A temporary approach occurs as a result of the drag input 810, and the proximity sensor 331, which has a first time configured as the recognition time, may thus fail to sense the drag input 810. In this case, no approach resulting from the drag input 810 is sensed, and the display 320 may accordingly not be turned off. The user may perform an operation following the drag input without turning off the display 320. For example, the user may drag the status bar 820 downwards without turning off the display 320.

Figure 9:
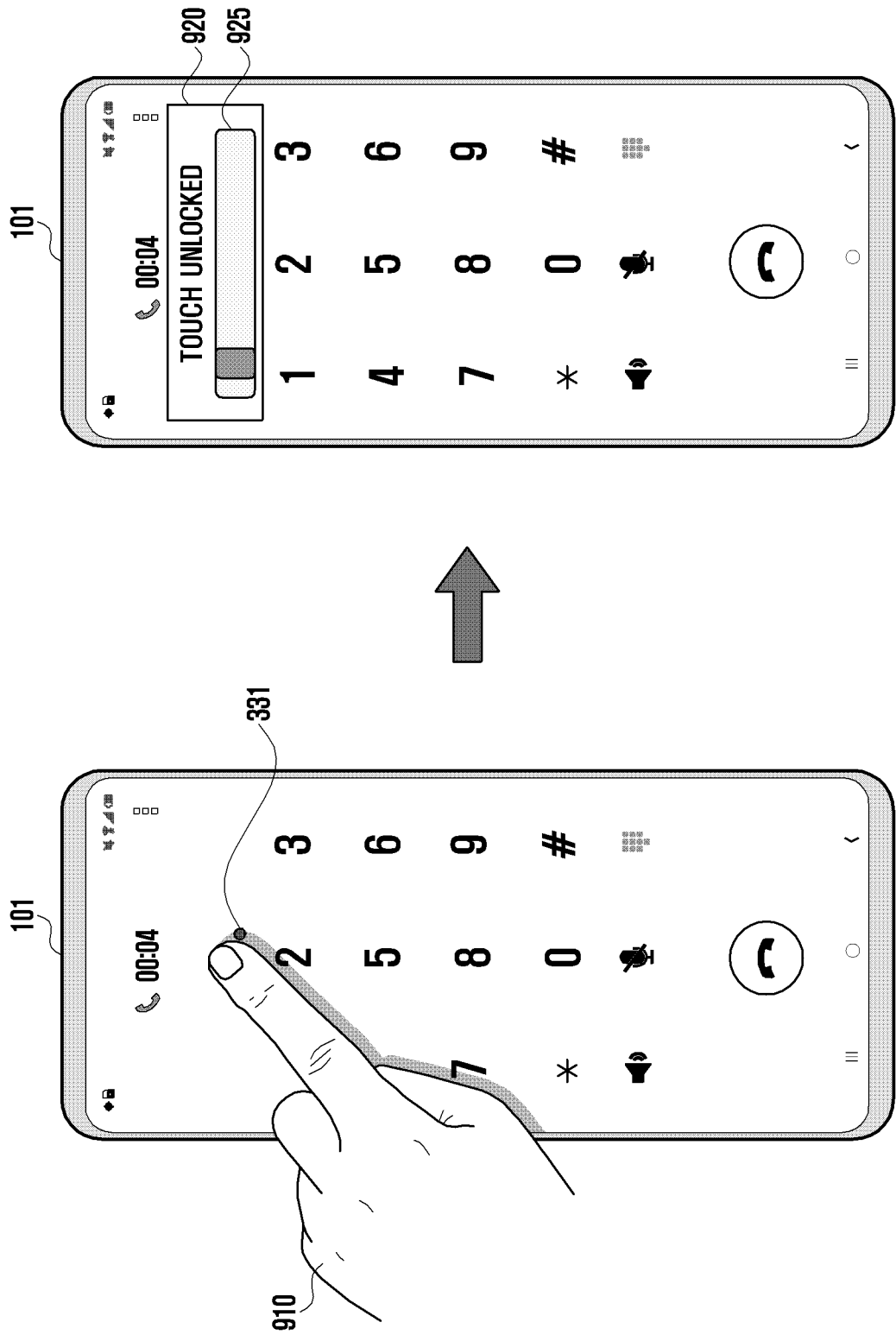
FIG. 9 illustrates operations of an electronic device, according to an embodiment.

FIG. 9 illustrates operations of an electronic device, according to an embodiment. Specifically, FIG. 9 illustrates operations of an electronic device 101 when it is determined that the user of the electronic device 101 has an intent to use a display 320.

Referring to FIG. 9, if it is determined that the user has an intent to use the display 320 of the electronic device 101, the processor 310 may determine that the recognition time of a proximity sensor 331 is a first time, which is relatively long, or that the number of samples to be recognized is a first number, which is relatively large.

The processor 310 may determine whether or not an approach occurs, based on a determine recognition criterion. Even if it has been determined that the recognition time of the proximity sensor 331 is the first time, an approach may be recognized beyond the determined first time. When an approaching external object is sensed based on the determined recognition time, the processor 310 may perform an operation of turning off the display 320. Alternatively, instead of instantly turning off the display 320, the processor 310 may display a user interface (UI) 920 for locking a touch input and unlocking the touch input.

When locking a touch input, the processor 310 may be prevented from receiving any touch input from the user, until a separate user input for unlocking the touch input is received. The processor 310 may ignore any user input while the user interface 920 for locking a touch input and unlocking the same is displayed.

If a preconfigured user input for unlocking the touch input is received through the user interface 920 for unlocking the touch input, the processor 310 may unlock the touch input and end the display of the user interface 920.

The preconfigured user input for unlocking the touch input may include a drag input in a specific position inside the user interface 920, or a touch input maintained for a specific time in the specific position. If a drag input is received in a drag region 925 inside the user interface 920 for unlocking the touch input, the processor 310 may unlock the touch input and end the display of the interface. If a specific region is touched for four seconds or longer, the processor 310 may unlock the touch input and end the display of the interface.

If an object (e.g., the user's hand 910) recognized through the proximity sensor 331 is no longer in proximity, the processor 310 may unlock the touch input and end the display of the user interface 920.

The user interface 920 for locking the touch input and unlocking the same may also be displayed when a continuous approach not intended by the user is sensed, in addition to filtering out temporary approaches through the proximity sensor 331, such that any touch input not intended by the user is prevented from occurring. Even if the user interface 920 is displayed after the touch input is locked, the user may easily unlock the touch input through a preconfigured user input.

Figure 10:
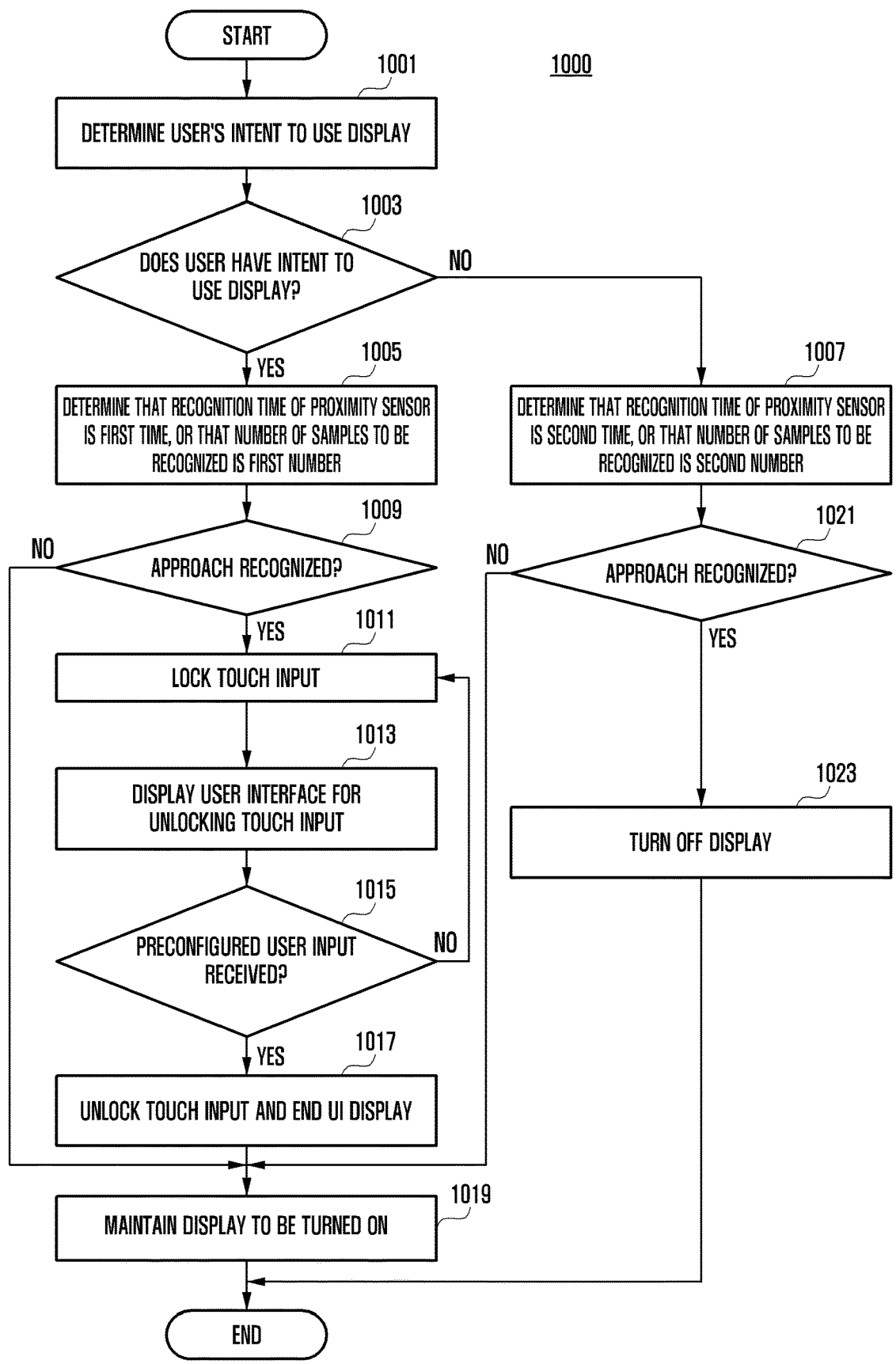
FIG. 10 is flowchart illustrating a method of an electronic device, according to an embodiment.

FIG. 10 is a flowchart illustrating a method of an electronic device, according to an embodiment. Specifically, FIG. 10 illustrates operations performed after determining the user's intent to use a display 320. The same descriptions as those in FIG. 6 and FIG. 7 will be omitted herein.

Referring to flowchart 1000, a processor 310 determines the user's intent to use the display 320, based on the user's posture and the movement of the electronic device 101, in step 1001. For example, the processor 310 may determine the user's posture through an inertial sensor 333, in response to activation of a specific application that uses a function of a proximity sensor 331, and may determine the movement of the electronic device 101 through the inertial sensor 333.

If it is determined in step 1003 that the user has an intent to use the display 320, the processor 310 may proceed to step 1005 and determine that the recognition time of the proximity sensor 331 is a first time, or that the number of samples to be recognized is a first number.

The processor 310 identifies, in step 1009, whether or not an approaching external object is recognized, based on a determined recognition criterion (for example, a recognition time or a number of samples to be recognized). If an approaching external object (for example, the user's hand) is recognized based on the determined recognition criterion, the processor 310 proceeds to step 1011 and locks the touch input. If no approaching external object is recognized based on the determined recognition criterion, the processor 310 proceeds to step 1019 and maintains the display 320 to be turned on.

The processor 310 may display a user interface (for example, user interface 920 in FIG. 9) for unlocking the touch input, after the touch input has been locked, in operation 1013.

The processor 310 identifies, in step 1015, whether or not a preconfigured user input for unlocking the touch input is received. The preconfigured user input for unlocking the touch input may include, for example, a drag input in a specific position inside the user interface, or a touch input maintained for a specific time in the specific position.

If the preconfigured user input for unlocking the touch input is received, the processor 310 proceeds to step 1017 and unlocks the touch input, and ends the display of the UI. The processor 310 maintains the display 320 to be turned on in step 1019.

If no preconfigured user input for unlocking the touch input is received, the processor 310 proceeds back to step 1011 and maintains the touch input to be locked.

If it is determined in step 1003 that the user has no intent to use the display 320, the processor 310 proceeds to step 1007 and determines that the recognition time of the proximity sensor 331 is a second time, or that the number of samples to be recognized is a second number.

The processor 310 identifies, in step 1021, whether or not an approaching external object is recognized, based on a determined configuration value (for example, a recognition time or a number of samples to be recognized).

If an approaching external object (for example, the user's hand) is recognized based on the determined configuration value, the processor 310 proceeds to step 1023 and turns off the display 320.

If no approaching external object is recognized based on the determined configuration value, the processor 310 proceeds to step 1019 and maintains the display 320 to be turned on.

Figure 11A:
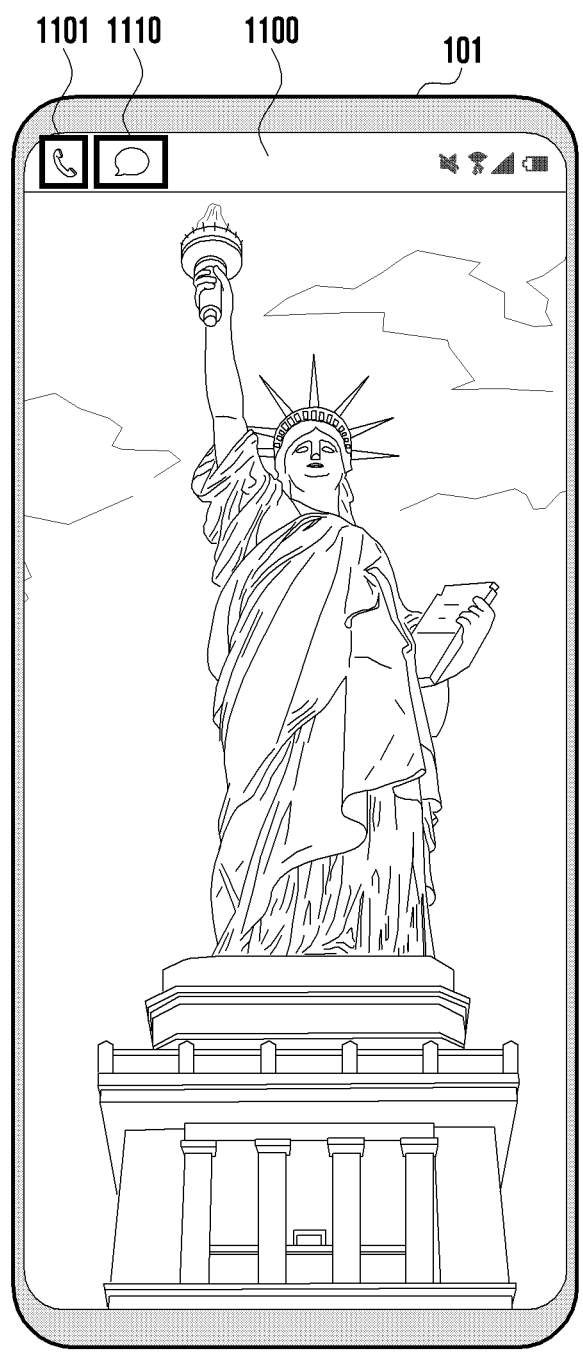
FIG. 11A is illustrates operations of an electronic device, according to an embodiment.
Figure 11B:
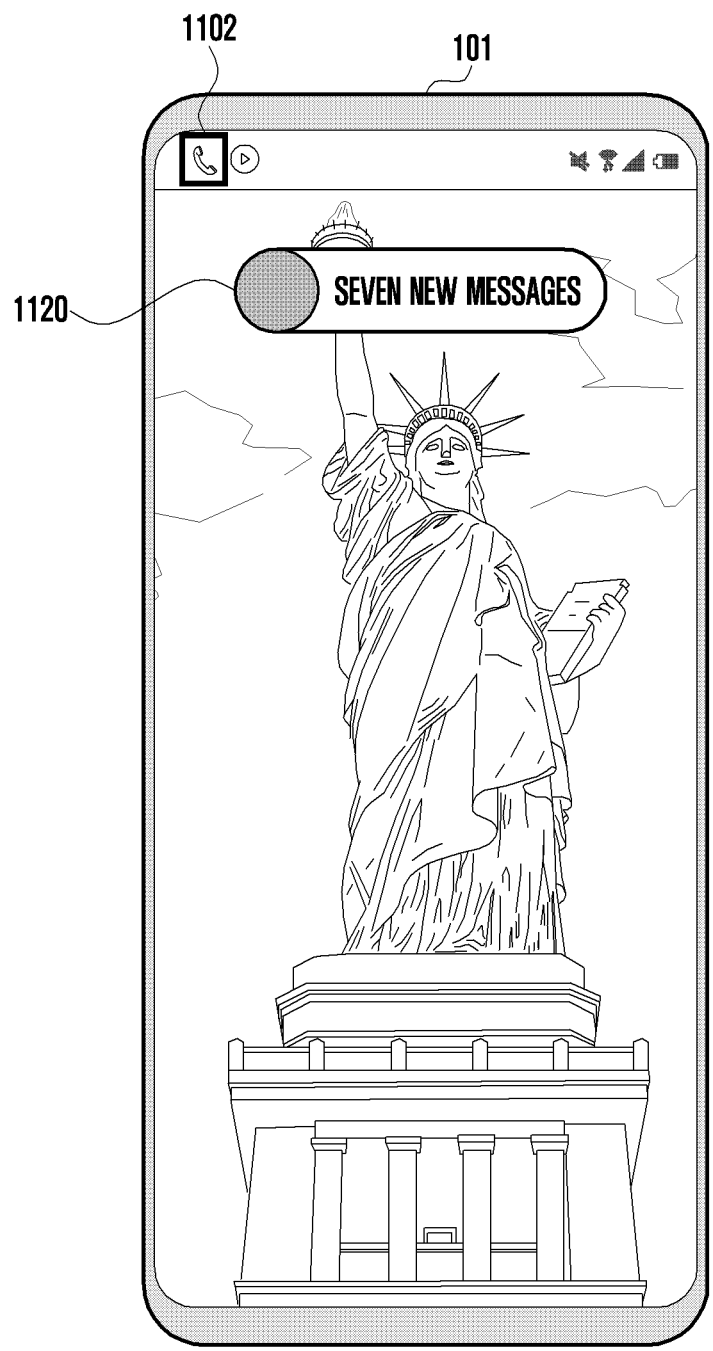
FIG. 11B illustrates operations of an electronic device, according to an embodiment.
Figure 11C:
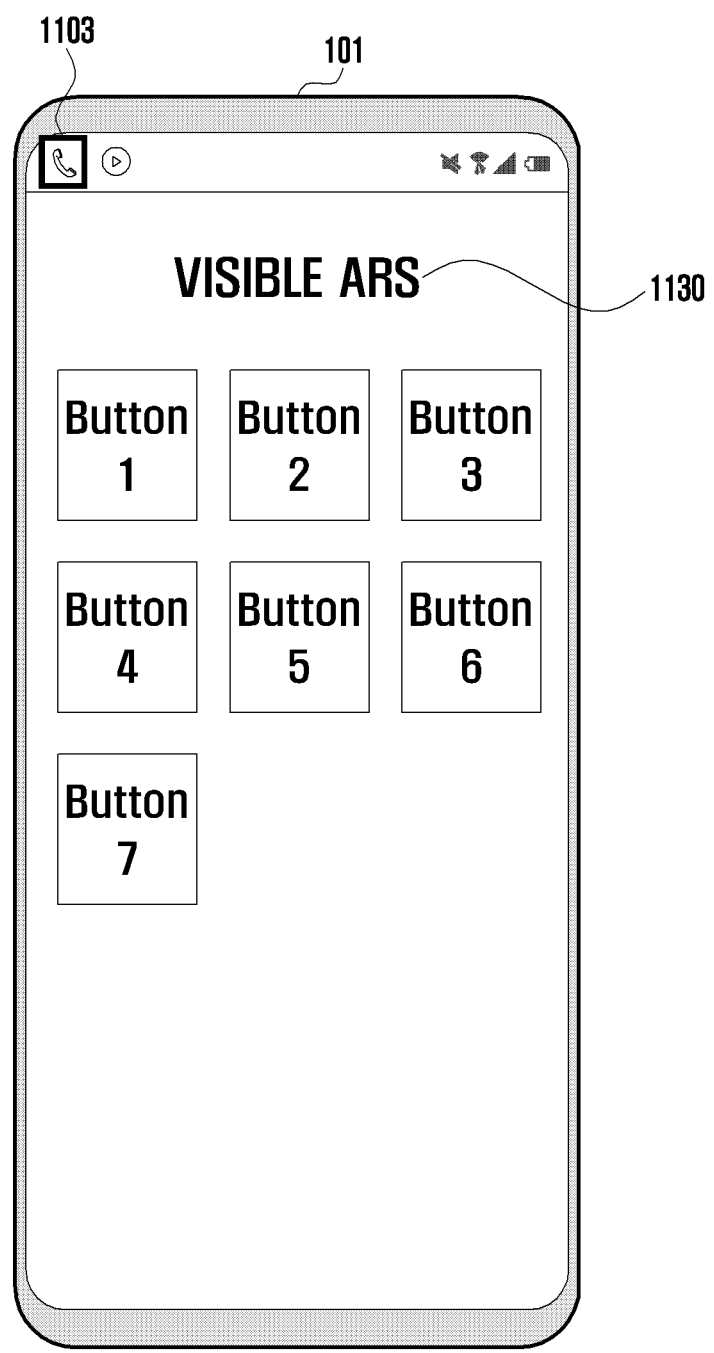
FIG. 11C illustrates operations of an electronic device, according to an embodiment.
Figure 11D:
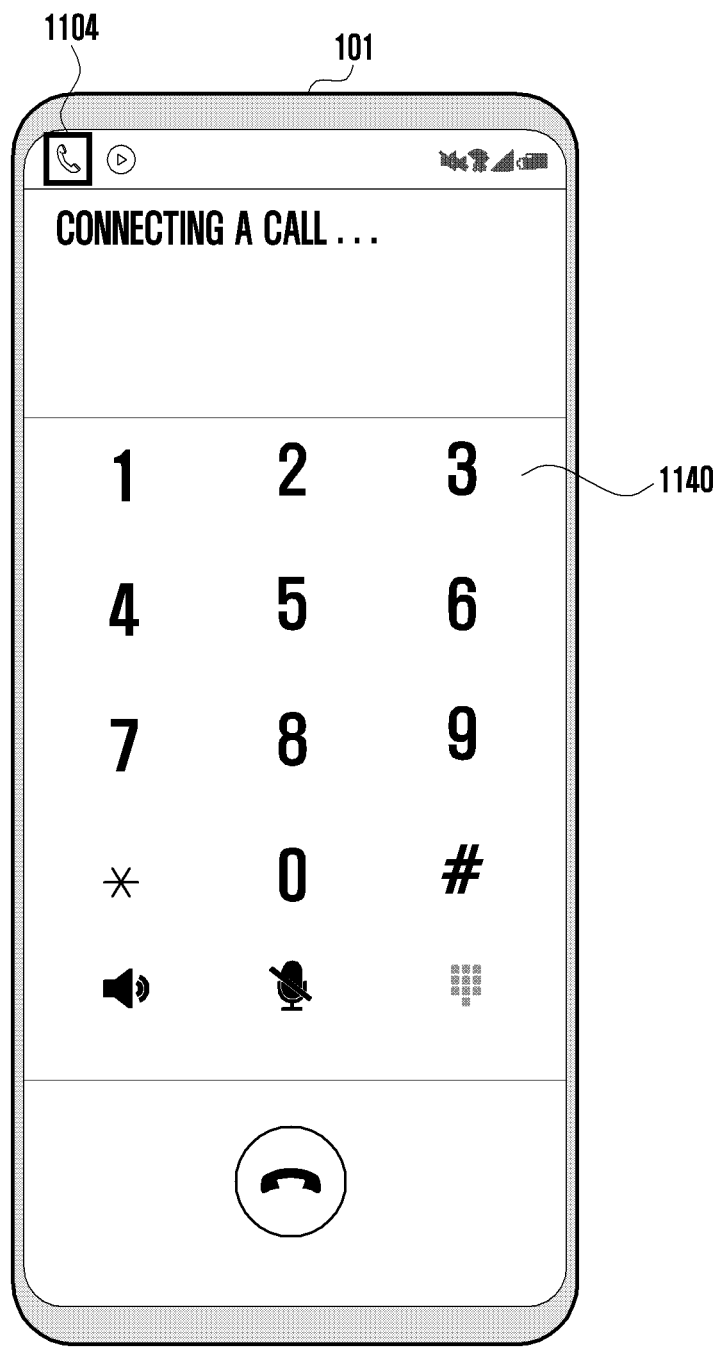
FIG. 11D illustrates operations of an electronic device, according to an embodiment.

FIG. 11A illustrates operations of an electronic device, according to an embodiment. FIG. 11B illustrates operations of an electronic device, according to an embodiment. FIG. 11C illustrates operations of an electronic device, according to an embodiment. FIG. 11D illustrates operations of an electronic device, according to an embodiment.

Specifically, FIG. 1A illustrates a method for determining the user's intent to use a display 320, based on an application operating state, and FIG. 11B illustrates a method for determining the user's intent to use a display 320, based on an application operating state.

Referring to FIGS. 11A to 11D, a processor 310 may determine whether or not the user has an intent to use the display 320 according to whether or not the operating state of a specific application (e.g., a telephone call application or a voice message application) satisfies a preconfigured operating state. Herein, it is assumed that the specific application is a telephone call application.

When the telephone call application is activated in the background, the processor 310 may determine that the user has an intent to use the display 320.

Referring to FIG. 11A, the processor 310 may determine that the user has an intent to use the display 320 if an alarm occurs while the telephone call application is executed in a speaker mode 1101. The processor 310 may determine that the user has an intent to use the display 320 if an alarm 1110 occurs on a status bar 1100 while the telephone call application is executed in the speaker mode.

Referring to FIG. 11B, the processor 310 may determine that the user has an intent to use the display 320 if a popup alarm 1120 occurs while the telephone call application is executed in a speaker mode 1102.

Referring to FIG. 11C, the processor 310 may determine that the user has an intent to use the display 320 if a visible automatic response system (ARS) 1130 of a telephone call application is activated while the telephone call application is executed 1103. The processor 310 may determine that the user has an intent to use the display 320 if a button-type ARS system of the telephone call application is activated.

Referring to FIG. 11D, the processor 310 may determine that the user has an intent to use the display 320 if a keypad 1140 of a telephone call application is displayed while the telephone call application is executed 1104.

Figure 12:
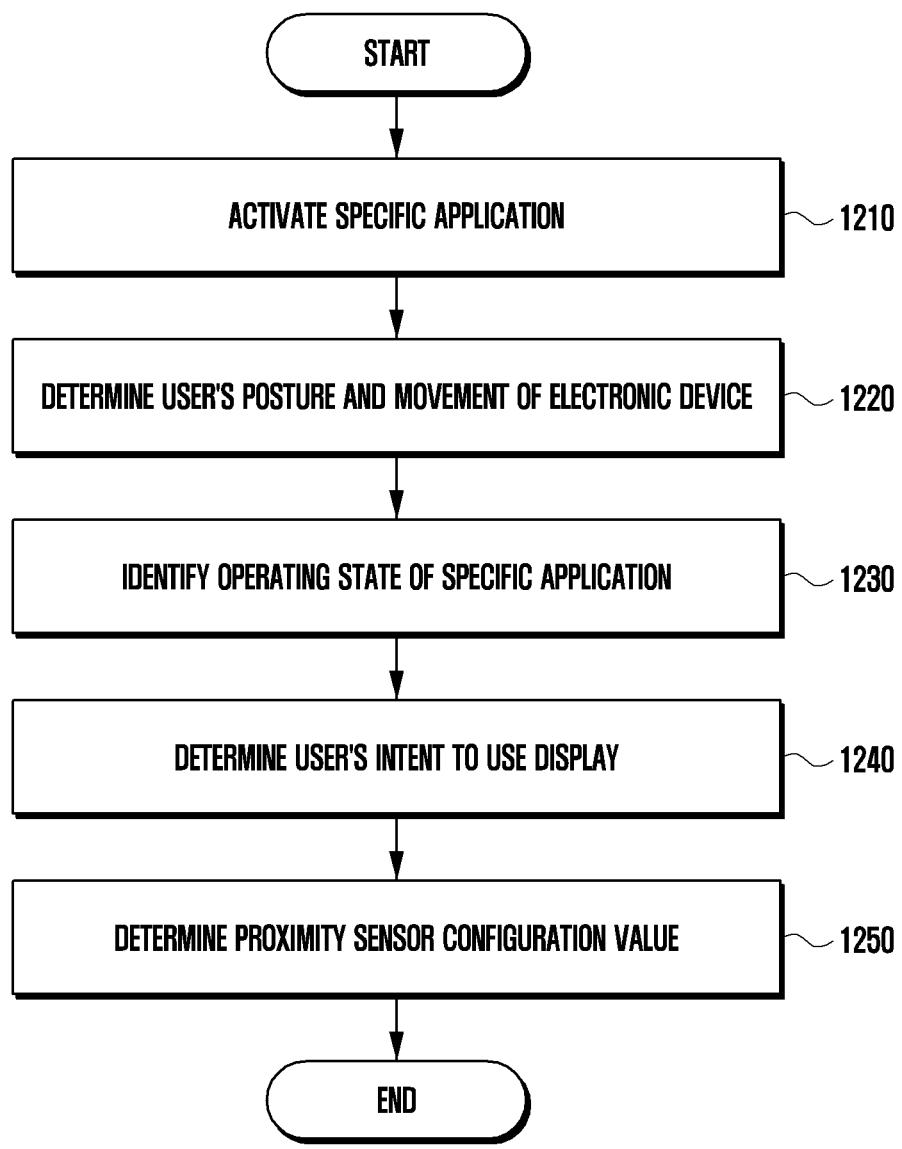
FIG. 12 is a flowchart illustrating a method of an electronic device, according to an embodiment.

FIG. 12 is a flowchart illustrating a method of an electronic device, according to an embodiment.

Referring to the flowchart 1200, a processor 310 identifies, in step 1210, whether or not a specific application that uses a function of a proximity sensor 331 has been activated.

The processor 310 determines the user's posture and the movement of the electronic device 101 through an inertial sensor 333, in response to activation of the specific application that uses a function of the proximity sensor 331, in step 1220.

The processor 310 identifies the operating state of the specific application in step 1230. The processor 310 may determine, for example, whether or not the operating state of the specific application satisfies a preconfigured operating state.

The preconfigured operating state of the specific application may include, for example, a state in which a telephone call application is activated in the background. The preconfigured operating state of the specific application may include a state in which an alarm (for example, an alarm on status bar or a popup alarm) occurs through the display 320 while the telephone call application is executed in a speaker mode. The preconfigured operating state of the specific application may include a state in which the visible ARS of the telephone call application is activated, a state in which the button-type ARS of the telephone call application is activated, or a state in which the keypad of the telephone call application is displayed.

The processor 310 determines the user's intent to use the display 320, based on at least one of the determined user's posture, the determined movement of the electronic device 101, or the determined operating state of the specific application, in step 1240.

The processor 310 determines a configuration value of the proximity sensor 331, based on the determined user's intent to use the display 320, in step 1250. The processor 310 may configure a reference value to be used by the proximity sensor 331 to recognize an object, based on the determined user's intent to use the display 320.

An electronic device 101 may include a housing 350 including a front plate, a rear plate facing away from the front plate, and a side member surrounding a space between the front plate and the rear plate; a display 320 having a first surface visible through the front plate; an inertial sensor 333; a proximity sensor 331 disposed on a second surface of the display 320; a processor 320 operatively connected to the proximity sensor 331, the inertial sensor 333, and the display 320; and a memory 340 operatively connected to the processor 310. The memory 340 may store instructions that, when executed, cause the processor 310 to determine a user's posture through the inertial sensor 333, in response to activation of a specific application using a function of the proximity sensor 331; determine a movement of the electronic device 101 through the inertial sensor 333; determine the user's intent to use the display 320, based on the user's posture and the movement of the electronic device 101; and determine a configuration value of the proximity sensor 331, based on the determined intent to use the display.

The instructions may be configured to cause the processor 310 to determine at least one of a recognition time during which the proximity sensor 331 is to determine whether or not an object approaches, or a number of samples to be recognized thereby, based on the determined user's intent.

The instructions may be configured to cause the processor 310 to determine that the user has an intent to use the display 320 in case that the user's posture is deemed to be a preconfigured posture when the movement of the electronic device 101 is deemed to occur within a preconfigured threshold range; and determine that the recognition time of the proximity sensor 331 is a first time, or that the number of samples to be recognized is a first number.

The instructions may be configured to cause the processor 310 to determine that the user has no intent to use the display 320 in case that the user's posture is not deemed to be the preconfigured posture; and determine that the recognition time of the proximity sensor 331 is a second time which is shorter than the first time, or that the number of samples to be recognized is a second number which is smaller than the first number.

The instructions may be configured to cause the processor 310 to determine that the user has no intent to use the display 320 in case that the movement of the electronic device 101 deviates from the preconfigured threshold range; and determine that the recognition time of the proximity sensor 331 is a second time which is shorter than the first time, or that the number of samples to be recognized is a second number which is smaller than the first number.

The preconfigured posture may include a posture in which the user stares at the display 320.

The instructions may be configured to cause the processor 310 to control the display 320 so as to display a user interface (for example, user interface 920 in FIG. 9) 920 for locking a touch input and unlocking the touch input in case that an approaching object is sensed through the proximity sensor 331, based on the configured recognition time or the number of samples to be recognized.

The instructions may be configured to cause the processor 310 to control the display 320 so as to unlock the touch input and to end display of the user interface in case that a preconfigured user input is sensed through the user interface (for example, user interface 920 in FIG. 9) 920.

The instructions may be configured to cause the processor 310 to control the display 320 so as to unlock the touch input and to end display of the user interface in case that no approaching object is sensed through the proximity sensor 331.

The specific application may include a telephone call application or a voice message application.

The instructions may be configured to cause the processor 310 to determine that the user has an intent to use the display 320 in case that the operating state of the specific application satisfies a preconfigured operating state. The preconfigured operating state may include at least one of a state in which a telephone call application using a function of the proximity sensor 331 is activated in the background, a state in which an alarm has occurred through the display 320 while the telephone call application operates in a speaker mode, a state in which a visible automatic response system of the telephone call application is activated, a state in which a button-type automatic response system of the telephone call application is activated, or a state in which a keypad of the telephone call application is displayed.

The proximity sensor 331 may include an optical proximity sensor, an RF proximity sensor, a capacitive proximity sensor, or an ultrasonic proximity sensor.

The instructions may be configured to cause the processor 310 to determine an amount of light to be used by the proximity sensor 331 to recognize an approach, based on the determined user's intent, in case that the proximity sensor 331 is the optical proximity sensor.

The instructions may be configured to cause the processor 310 to: track the user by using sensor data provided from the inertial sensor 333; and determine the user's posture, based on a result of the tracking.

A method for operating an electronic device 101 may include the operations of determining a user's posture through an inertial sensor 333, in response to activation of a specific application using a function of a proximity sensor 331; determining a movement of the electronic device 101 through the inertial sensor 333; determining the user's intent to use a display 320, based on the user's posture and the movement of the electronic device 101; and determining a configuration value of the proximity sensor 331, based on the determined intent to use the display.

The operation of determining a configuration value may be an operation of determining at least one of a recognition time during which the proximity sensor 331 is to determine whether or not an object approaches, or a number of samples to be recognized by the proximity sensor, based on the determined user's intent.

The operation of determining the user's intent to use the display 320 may be an operation of determining that the user has an intent to use the display 320 in case that the user's posture is deemed to be a preconfigured posture when the movement of the electronic device 101 is deemed to occur within a preconfigured threshold range. The operation of determining the configuration value may be an operation of determining that the recognition time of the proximity sensor 331 is a first time, or that the number of samples to be recognized is a first number.

The operation of determining the user's intent to use the display 320 may be an operation of determining that the user has no intent to use the display 320 in case that the user's posture is not deemed to be the preconfigured posture. The operation of determining the configuration value may be an operation of determining that the recognition time of the proximity sensor 331 is a second time which is shorter than the first time, or that the number of samples to be recognized is a second number which is smaller than the first number.

The operation of determining the user's intent to use the display 320 may be an operation of determining that the user has no intent to use the display 320 in case that the movement of the electronic device 101 deviates from the preconfigured threshold range. The operation of determining the configuration value may be an operation of determining that the recognition time of the proximity sensor 331 is a second time which is shorter than the first time, or that the number of samples to be recognized is a second number which is smaller than the first number.

The preconfigured posture may include a posture in which the user stares at the display.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:
a housing comprising a front plate, a rear plate facing away from the front plate, and a side member surrounding a space between the front plate and the rear plate;
a display having a first surface visible through the front plate;
an inertial sensor;
a proximity sensor disposed on a second surface of the display;
a processor operatively connected to the proximity sensor, the inertial sensor, and the display; and
a memory operatively connected to the processor, wherein the memory is configured to store instructions that, when executed, cause the processor to:
acquire sensor data from the inertial sensor, in response to activation of a specific application using a function of the proximity sensor; and
determine a configuration value of the proximity sensor, based on the sensor data,
wherein determining the configuration value of the proximity sensor includes determining a recognition time during which the proximity sensor is to determine whether or not an object approaches, based on the sensor data, and
wherein the recognition time is a duration during which multiple samples are taken to recognize an object.

2. The electronic device of claim 1, wherein determining the configuration value of the proximity sensor further includes determining a number of samples to be recognized by the proximity sensor, based on the sensor data, and
wherein the instructions, when executed, further cause the processor to:
determine that the recognition time of the proximity sensor is a first time, or that the number of samples to be recognized is a first number, based on the sensor data being within a preconfigured threshold range.

3. The electronic device of claim 2, wherein the instructions, when executed, further cause the processor to:
determine that the recognition time of the proximity sensor is a second time which is shorter than the first time, or that the number of samples to be recognized is a second number which is smaller than the first number, based on the sensor data exceeding the preconfigured threshold range.

4. The electronic device of claim 2, wherein the instructions, when executed, further cause the processor to control the display to display a user interface for locking a touch input and unlocking the touch input in case that an approaching object is sensed through the proximity sensor, based on the configured recognition time or the number of samples to be recognized.

5. The electronic device of claim 4, wherein the instructions, when executed, further cause the processor to control the display so as to unlock the touch input and to end display of the user interface in case that a preconfigured user input is sensed through the user interface.

6. The electronic device of claim 4, wherein the instructions, when executed, further cause the processor to control the display so as to unlock the touch input and to end display of the user interface in case that no approaching object is sensed through the proximity sensor.

7. The electronic device of claim 1, wherein the instructions, when executed, further cause the processor to:
control the display to activate an auto screen off function, based on the configuration value of the proximity sensor.

8. The electronic device of claim 1, wherein the specific application comprises a telephone call application or a voice message application.

9. The electronic device of claim 1, wherein the proximity sensor comprises an optical proximity sensor, a radio frequency (RF) proximity sensor, a capacitive proximity sensor, or an ultrasonic proximity sensor.

10. The electronic device of claim 9, wherein the instructions, when executed, further cause the processor to determine an amount of light to be used by the proximity sensor to recognize an approach, based on the sensor data, in case that the proximity sensor is the optical proximity sensor.

11. The electronic device of claim 1, wherein the instructions, when executed, further cause the processor to:
track a user by using the sensor data provided from the inertial sensor; and
determine the configuration value of the proximity sensor, based on a result of the tracking.

12. An electronic device, comprising:
a display;
a proximity sensor disposed on a rear surface of the display;
a processor operatively connected to the proximity sensor and the display; and
a memory operatively connected to the processor, wherein the memory is configured to store instructions that, when executed, cause the processor to:
determine a configuration value of the proximity sensor, in case that an operating state of a specific application satisfies a preconfigured operating state,
wherein the preconfigured operating state comprises at least one of:
a state in which a telephone call application using a function of the proximity sensor is activated in the background,
a state in which an alarm has occurred through the display while the telephone call application operates in a speaker mode,
a state in which a visible automatic response system of the telephone call application is activated,
a state in which a button-type automatic response system of the telephone call application is activated, or
a state in which a keypad of the telephone call application is displayed,
wherein determine the configuration value of the proximity sensor further includes determining a recognition time during which the proximity sensor is to determine whether or not an object approaches, based on the sensor data, and
wherein the recognition time is a duration during which multiple samples are taken to recognize an object.

13. A method for operating an electronic device, the method comprising:
identifying sensor data provided from an inertial sensor, in response to activation of a specific application using a function of a proximity sensor; and
determining a configuration value of the proximity sensor, based on the sensor data,
wherein determining the configuration value further includes determining a recognition time during which the proximity sensor is to determine whether or not an object approaches, based on the sensor data, and wherein the recognition time is a duration during which multiple samples are taken to recognize an object.

14. The method device of claim 13, wherein determining the configuration value of the proximity sensor further includes determining a number of samples to be recognized by the proximity sensor, based on the sensor data, and wherein the determining the configuration value further includes determining that the recognition time of the proximity sensor is a first time, or that the number of samples to be recognized is a first number, based on the sensor data being within a preconfigured threshold range.

15. The method of claim 14, wherein determining the configuration value further includes determining that the recognition time of the proximity sensor is a second time which is shorter than the first time, or that the number of samples to be recognized is a second number which is smaller than the first number, based on the sensor data exceeding the preconfigured threshold range.

16. The method of claim 13, further comprising:

controlling a display to activate an auto screen off function, based on the configuration value of the proximity sensor.

* * * * *